United States Patent
Nakazawa et al.

(10) Patent No.: US 12,386,365 B2
(45) Date of Patent: Aug. 12, 2025

(54) INFORMATION PROCESSING SYSTEM, INFORMATION PROCESSING METHOD, AND PROGRAM

(71) Applicant: Rakuten Group, Inc., Tokyo (JP)

(72) Inventors: Mitsuru Nakazawa, Tokyo (JP); Hiroaki Iwase, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 305 days.

(21) Appl. No.: 16/763,436

(22) PCT Filed: Nov. 22, 2018

(86) PCT No.: PCT/JP2018/043243
§ 371 (c)(1),
(2) Date: May 12, 2020

(87) PCT Pub. No.: WO2020/105183
PCT Pub. Date: May 28, 2020

(65) Prior Publication Data
US 2021/0208606 A1 Jul. 8, 2021

(51) Int. Cl.
*G05D 1/00* (2024.01)
*B64U 10/13* (2023.01)
*B64U 101/20* (2023.01)

(52) U.S. Cl.
CPC ............. *G05D 1/106* (2019.05); *B64U 10/13* (2023.01); *G05D 1/0204* (2013.01); *G05D 1/104* (2013.01);
(Continued)

(58) Field of Classification Search
CPC ...... G05D 1/106; G05D 1/0204; G05D 1/104; B64C 39/024; B64C 2201/027; B64C 2201/14; G05B 2219/39146
See application file for complete search history.

(56) References Cited

U.S. PATENT DOCUMENTS 6,718,236 B1 * 4/2004 Hammer ................ G08G 5/025
701/16
10,876,920 B1 * 12/2020 McFarland .............. B64F 5/60
(Continued)

FOREIGN PATENT DOCUMENTS

CN 105242684 A 1/2016
JP 2005-082018 A 3/2005
(Continued)

OTHER PUBLICATIONS

International Search Report for PCT/JP2018/043243 dated Feb. 26, 2019 (PCT/ISA/210).

*Primary Examiner* — Jelani A Smith
*Assistant Examiner* — Davin Seol
(74) *Attorney, Agent, or Firm* — Sughrue Mion, PLLC

(57) ABSTRACT

To reduce environmental influence in flight (including taking-off and landing) of a flying object, main drone current position information acquisition unit acquires a current position of a main drone from a main drone control terminal, and provides the current position to the movement instruction unit. The sub-drone current position information acquisition unit acquires a current position from the sub-drone, and provides it to the movement instruction unit. The movement instruction unit determines a movement position of the sub-drone on the basis of the current position of the main drone. In addition, the movement instruction unit generates a movement instruction for the sub-drone based on a difference between the current position and the movement position of the sub-drone, and transmits the movement instruction to the sub-drone. The drive control unit acquires the movement instruction transmitted from the sub-drone control terminal.

20 Claims, 11 Drawing Sheets

(52) U.S. Cl.
CPC ...... *B64U 2101/20* (2023.01); *B64U 2201/00* (2023.01); *B64U 2201/104* (2023.01)

(56) References Cited

U.S. PATENT DOCUMENTS

| | | |
|---|---|---|
| 2014/0039732 A1 | 2/2014 | Spinelli et al. |
| 2014/0142788 A1 | 5/2014 | Denton |
| 2016/0189549 A1 | 6/2016 | Marcus |
| 2016/0293018 A1* | 10/2016 | Kim ........................ G05D 1/104 |
| 2018/0005534 A1 | 1/2018 | Jesudason et al. |
| 2018/0074520 A1* | 3/2018 | Liu ......................... G08G 5/045 |
| 2018/0156616 A1* | 6/2018 | Bennett ................. B64C 39/024 |
| 2018/0244386 A1* | 8/2018 | Phan ..................... G08G 5/0069 |
| 2018/0327091 A1 | 11/2018 | Burks et al. |
| 2019/0051195 A1* | 2/2019 | De La Guardia Gonzalez ........... G08G 5/0008 |
| 2019/0101934 A1* | 4/2019 | Tuukkanen ............ G01C 21/20 |
| 2019/0147751 A1 | 5/2019 | Sasao |
| 2019/0227555 A1* | 7/2019 | Sun ......................... G08G 1/005 |
| 2019/0265735 A1 | 8/2019 | Ishikawa et al. |
| 2019/0354113 A1 | 11/2019 | Ogawa et al. |
| 2020/0074866 A1* | 3/2020 | Delaney ................ G08G 5/0008 |
| 2020/0117220 A1* | 4/2020 | Paglieroni ............. G08G 5/0078 |
| 2020/0409395 A1* | 12/2020 | Hilliges .................. H04N 7/185 |
| 2021/0012667 A1* | 1/2021 | Sabato .................... G08G 5/045 |
| 2021/0020052 A1* | 1/2021 | Nagai ..................... G08G 5/045 |
| 2021/0211187 A1* | 7/2021 | Tsutsui ................. G08G 5/0013 |
| 2021/0255316 A1* | 8/2021 | Endo ...................... G05D 1/046 |
| 2021/0269143 A1* | 9/2021 | Nishio ................... B64D 45/00 |

FOREIGN PATENT DOCUMENTS

| | | |
|---|---|---|
| JP | 2015-512818 A | 4/2015 |
| JP | 2015-191254 A | 11/2015 |
| JP | 2018-005914 A | 1/2018 |
| JP | 2018-034691 A | 3/2018 |
| KR | 10-2018-0096852 A | 8/2018 |
| WO | 2013/119317 A1 | 8/2013 |
| WO | 2017/022058 A1 | 2/2017 |
| WO | 2017/216854 A1 | 12/2017 |
| WO | 2018/062336 A1 | 4/2018 |
| WO | 2018/105599 A1 | 6/2018 |

* cited by examiner

INFORMATION PROCESSING SYSTEM, INFORMATION PROCESSING METHOD, AND PROGRAM

CROSS REFERENCE TO RELATED APPLICATIONS

This application is a National Stage of International Application No. PCT/JP2018/043243 filed Nov. 22, 2018.

TECHNICAL FIELD

The present invention relates to an information processing system, an information processing method, and a program.

BACKGROUND ART

In the related art, an unmanned flying object (hereinafter, also referred to as "drone") that generates a lifting force by rotating a propeller and moves freely in the air exists. In flight (including taking-off and landing. The same shall apply hereinafter), the drone may be influenced by an environment (mainly wind), and thus it is desired to reduce the influence. In this regard, there is a technology of acquiring, in flight of the drone, information relating to an environment such as a wind direction and a wind speed (hereinafter, referred to as "environmental information") by disposing a measurement device such as an anemometer at a predetermined fixed position (for example, a base station), and attempting to reduce environmental influence by using the environmental information (for example, refer to Patent Document 1).
Patent Document 1: Japanese Unexamined Patent Application, Publication No. 2018-34691

SUMMARY OF INVENTION

Technical Problem

However, according to the related art including the technology described in Patent Document 1, since the measurement device is disposed at a predetermined fixed position, only the environmental information at the fixed position can be obtained. On the other hand, in general, the wind direction or the wind speed is greatly different depending on a position or a height. Accordingly, in flight of the drone, it is difficult to sufficiently reduce the environmental influence when using only the environmental information of the fixed position of the base station or the like. This is also true of a flying object other than the drone.

One or more embodiments of the present invention have been made in consideration of such circumstances, and are directed to effectively reduce an influence of an environment in flight of a flying object.

Solution to Problem

To accomplish the above-described object, according to an aspect of the invention, there is provided an information processing system. The information processing system includes a flying object, a control device that executes flight control of the flying object, and a mobile object that supports flight of the flying object. The information processing system includes: a movement control unit that executes movement control of the mobile object on the basis of a state of the flying object; an acquisition unit that acquires measurement information relating to an ambient environment of the mobile object; and a transmission control unit that executes control of transmitting the measurement information or processed information of the measurement information to the control device or the flying object.

Advantageous Effects of Invention

According to one or more embodiments of the present invention, it is possible to effectively reduce an environmental influence in flight of a flying object.

DESCRIPTION OF EMBODIMENTS

First Embodiment

Figure 1:
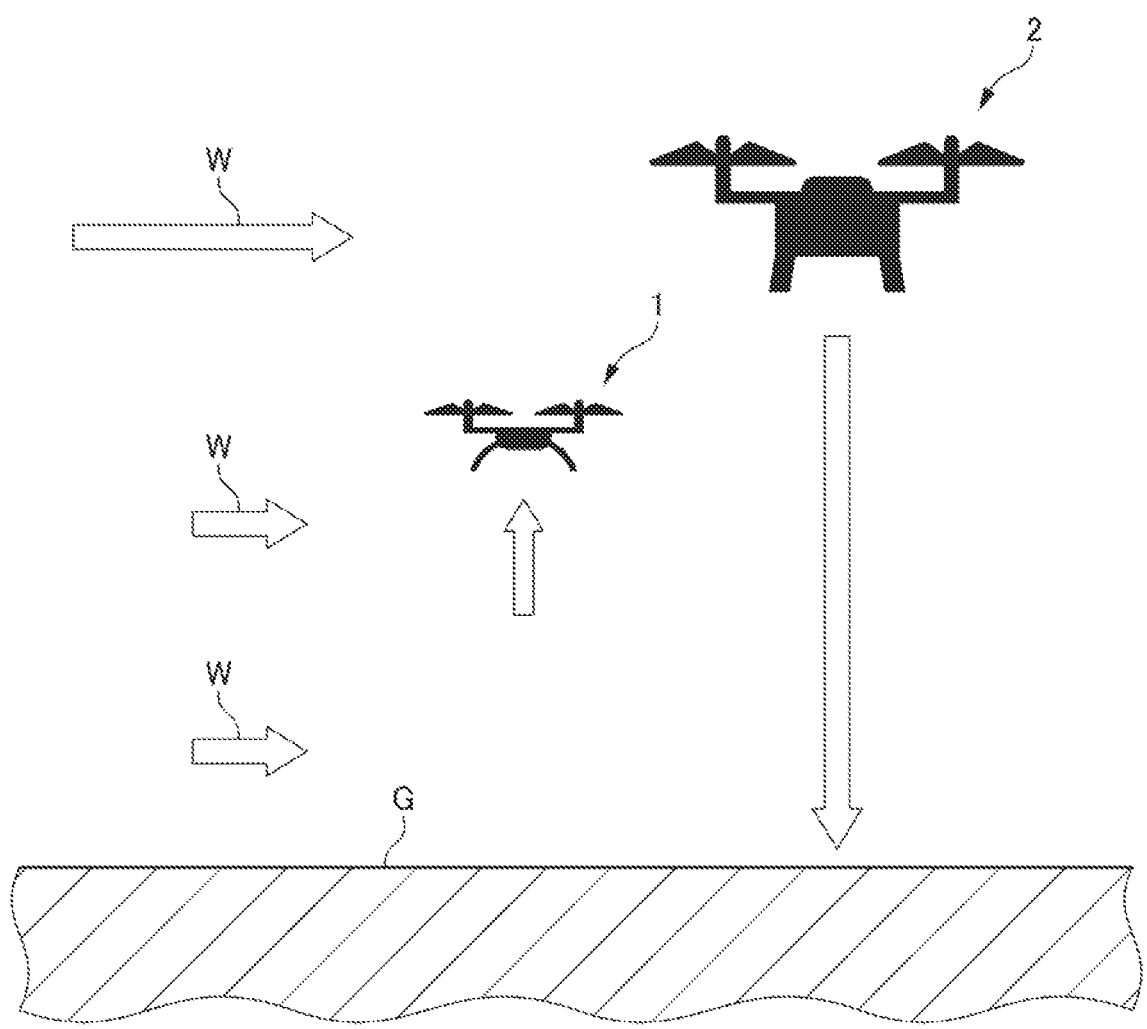
FIG. 1 is a diagram illustrating an outline of a mobile object of which movement is controlled by a flight system according an embodiment of an information processing system of the invention.

Hereinafter, a first embodiment of the invention will be described with reference to the accompanying drawings. FIG. 1 is a diagram illustrating an outline of a mobile object of which movement is controlled by a flight system according to an embodiment of an information processing system of the invention.

In the first embodiment, one or more drones 1 (one sub-drone 1 in an example illustrated in FIG. 1) exist as mobile objects that assist taking-off and landing of one drone 2 that flies as a main drone. Note that, hereinafter, the drone 1 that is an embodiment of the mobile object of the invention will be referred to as "sub-drone 1". The drone 2 that is an embodiment of a flying object that flies with support of the drone 1 will be referred to as "main drone 2".

In the example illustrated in FIG. 1, a predetermined site on the ground G that extends in a right and left direction in the same drawing is set as a landing point of the main drone 2. The main drone 2 is required to move in a vertical direction (an upper and lower direction in FIG. 1) with respect to the ground G for landing. However, the main drone 2 is placed in an environment where wind W is blowing. Here, the wind W is drawn by a white arrow in FIG. 1. A direction indicated by the white arrow represents a wind direction, and a length of the white arrow represents a wind speed. That is, in the example illustrated in FIG. 1, the wind W is blowing in a direction from the left to the right in the same drawing, and the wind speed increases as going upward in the same drawing. As in the example illustrated in FIG. 1, the main drone 2 is likely to be influenced by an environment such as the wind W in flight. Particularly, the main drone 2 may be placed in an environment where strong wind H is blowing at the time of taking-off and landing in many cases, and when an environmental influence is not reduced through appropriate flight control in this case, the main drone 2 may be difficult to land at a scheduled landing point, and there is also a concern that the main drone 2 may be damaged due to collision with the ground G, or the like. Here, to reduce an environment influence on the main drone 2, at is necessary to acquire environmental information indicating a wind direction or a wind speed of the wind W.

As a technology for acquiring the environmental information, the related art in which a measurement device such as an anemometer is disposed at a fixed position exists. However, an environment is different in correspondence with a position, particularly, in correspondence with a position in a vertical direction. For example, in the example illustrated in FIG. 1, the wind speed of the wind W is faster as going upward in the same drawing. Accordingly, even in the case of using the measurement device provided at a fixed position (not illustrated in FIG. 1), it is difficult to reduce the environmental influence on the main drone 2 that exists at a position different from the fixed position. Here, there is a plan in which a plurality of measurement devices are provided near a landing point of the main drone 2 at sites with different altitudes, but even in this plan, a plurality of measurement devices are used only at fixed positions. That is, since the main drone 2 changes a current position every moment in real time, the environment (wind W) also varies every movement in real time. Even when employing the plan with respect to an environment that varies every moment in real time, it is difficult to reduce the environmental influence.

In contrast, the sub-drone 1 moves in accordance with control based on a state of the main drone 2. For example, the sub-drone 1 moves a position at which a current position or a predicted position of the main drone 2 is set as a reference on the basis of the control, and can acquire environmental information of the position. According to this, even with respect to an environment that varies every movement in real time, it is possible for the main drone 2 to appropriately reduce an influence of the environment. Here, for example, the predicted position represents a position of movement destination of the main drone 2 which is predicted on the basis of information relating to a movement route of the main drone 2, a current position of the main drone 2, a posture such as an inclination acquired from various sensors (for example, a sensor unit 59 in FIG. 5 to be described later), information relating to a movement speed of the main drone 2 and the like.

That is, with respect to the main drone 2 that moves downward in FIG. 1 for landing based on the control, the sub-drone 1 moves to be located on a downward side of the main drone 2, and acquires information indicating a wind direction and a wind speed of the wind W as environmental information. The environmental information acquired as described above is transmitted, for example, to a control device (a main drone control terminal 4 in FIG. 2 or the like as described later) of the main drone 2. Here, for example, the control device gives an instruction for the main drone 2 to move in consideration of an influence (a wind direction and a wind speed) of the wind W on a downward side (a site where environmental information is acquired by the sub-drone 1) of a current position of the main drone 2. According to this, the main drone 2 can perform flight in which the influence of the wind W is reduced, and as a result, it is possible to land at an originally scheduled landing point on the ground G. As described above, the sub-drone 1 according to the first embodiment appropriately moves in correspondence with a movement route of the main drone 2 scheduled to take off or land, and acquires environmental information of the movement point to assist taking-off and landing of the main drone 2.

Note that, with regard to a method of acquiring the environmental information in the sub-drone 1, and the like, there is no particular limitation in the above-described example. That is, the sub-drone 1 can acquire the environmental information one or more times. Specifically, for example, the sub-drone 1 may acquire the environmental information for constant time in flight, or in a case where the environment varies, the sub-drone 1 may acquire the environmental information by setting, for example, a case where a wind direction or a wind speed varies or the like as a trigger.

Figure 2:
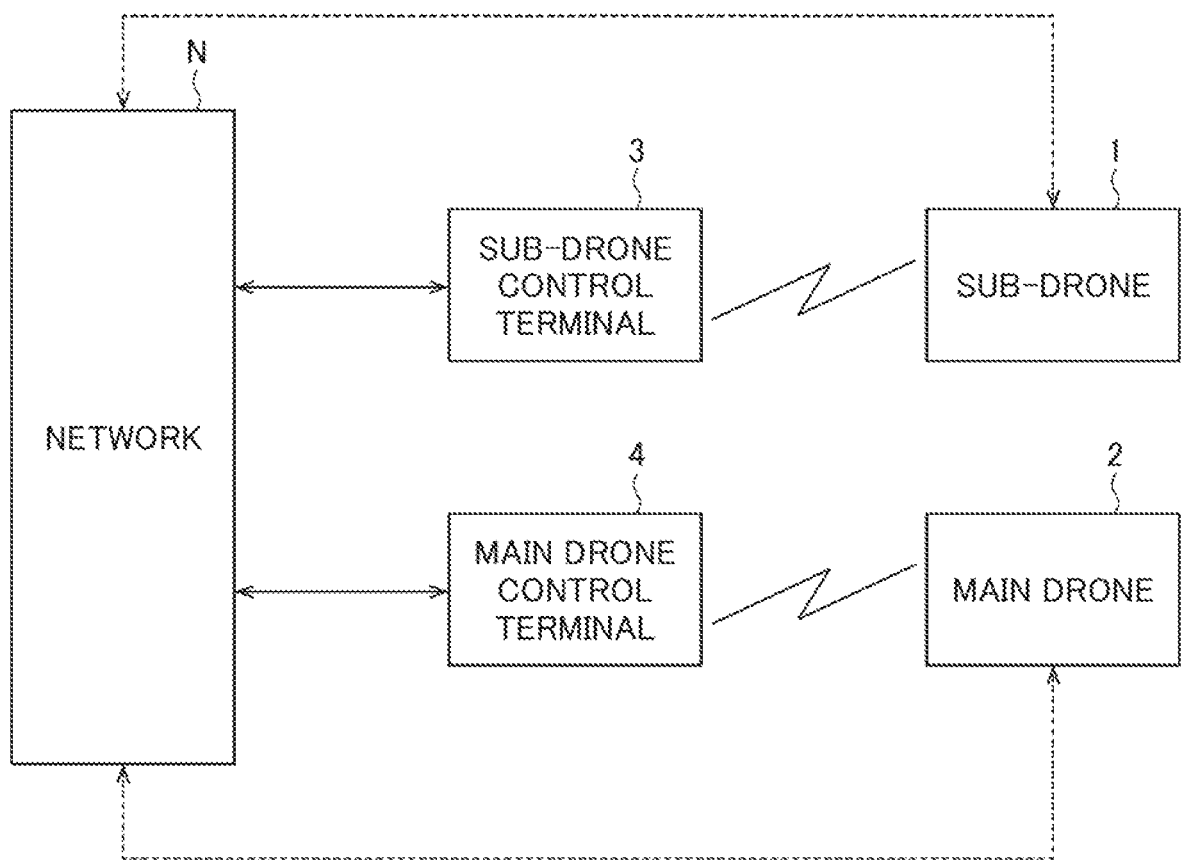
FIG. 2 is a diagram illustrating an example of a configuration of the flight system illustrated in FIG. 1.

FIG. 2 is a diagram illustrating an example of a configuration of the flight system illustrated in FIG. 1, that is, the flight system of the first embodiment of the information processing system of the invention. The flight system in the example illustrated in FIG. 2 is configured to include a sub-drone control terminal 3 and a main drone control terminal 4 in addition to the sub-drone 1 and the main drone 2.

The sub-drone control terminal 3 transmits and receives various pieces of information to and from the sub-drone 1 to control flight of the sub-drone 1. The main drone control terminal 4 transmits and receives various pieces of information to and from the main drone 2 to control flight of the main drone 2.

Figure 3:
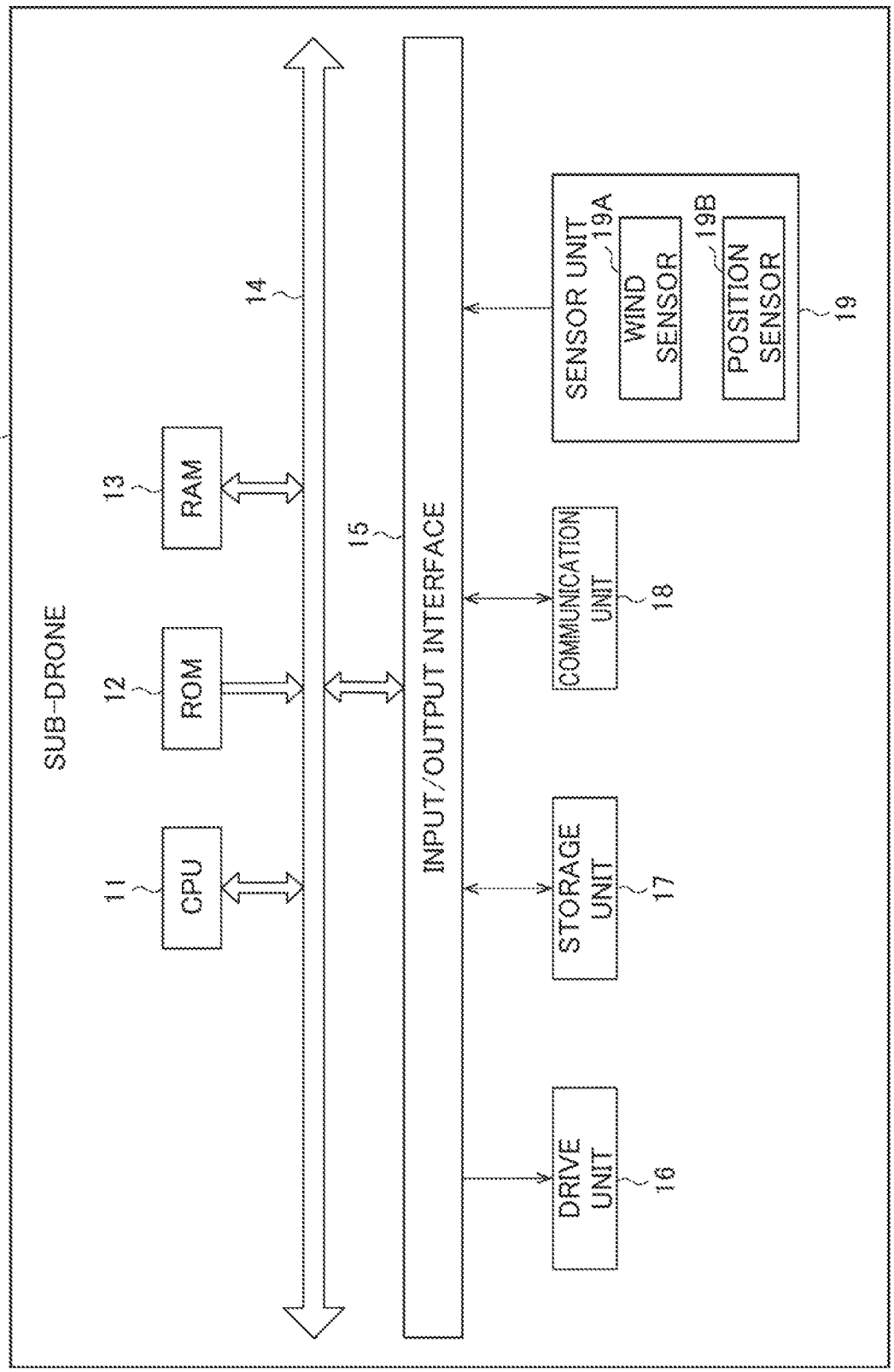
FIG. 3 is a block diagram illustrating an example of a hardware configuration of a sub-drone in the flight system illustrated in FIG. 2.

FIG. 3 is a block diagram illustrating an example of a hardware configuration of the sub-drone in the flight system illustrated in FIG. 2. The sub-drone 1 includes a central processing unit (CPU) 11, a read only memory (ROM) 12, a random access memory (RAM) 13, a bus 14, an input/output interface 15, a drive unit 16, a storage unit 17, a communication unit 18, and a sensor unit 19.

The CPU 11 executes various kinds of processing in accordance with a program that is recorded in the ROM 12, or a program that is loaded on the RAM 13 from the storage unit 17. Information necessary for the CPU 11 to execute various kinds of processing is appropriately stored in the RAM 13, The CPU 11, the ROM 12, and the RAM 13 are connected to each other through the bus 14. The input/output interface 15 is also connected to the bus 14. The drive unit 16, the storage unit 17, the communication unit 18, and the sensor unit 19 are connected to the input/output interface 15.

The drive unit 16 is constituted as a drive device that drives a motor (not illustrated) or the like which rotates a propeller (not illustrated) mounted on the sub-drone 1, or the like.

The storage unit 17 is constituted by a hard disk, a dynamic random access memory (DRAM), or the like, and stores various pieces of information. For example, the storage unit 17 stores various pieces of information acquired from the sensor unit 19. The communication unit 18 controls communication with other devices (for example, the sub-drone control terminal 3 illustrated in FIG. 2, or the like) in accordance with a method conforming to standards of Bluetooth (registered trademark), near field communication (NFC) (registered trademark), or the like, a method through a network N including the Internet, or the like.

The sensor unit 19 is constituted by various sensors such as a wind sensor 19A or a position sensor 19B, and acquires various pieces of information. For example, the wind sensor 19A is constituted by an anemometer or the like and measures a wind direction and a wind speed of the sub-drone 1 at a current position. For example, the position sensor 19B is constituted by a global positioning system (GPS) sensor or an altitude sensor, and acquires a current position of the sub-drone 1 as three-dimensional coordinates. Note that, with regard to the sensor unit 19, a sensor that detects various amounts relating to other environments may be provided.

Figure 4:
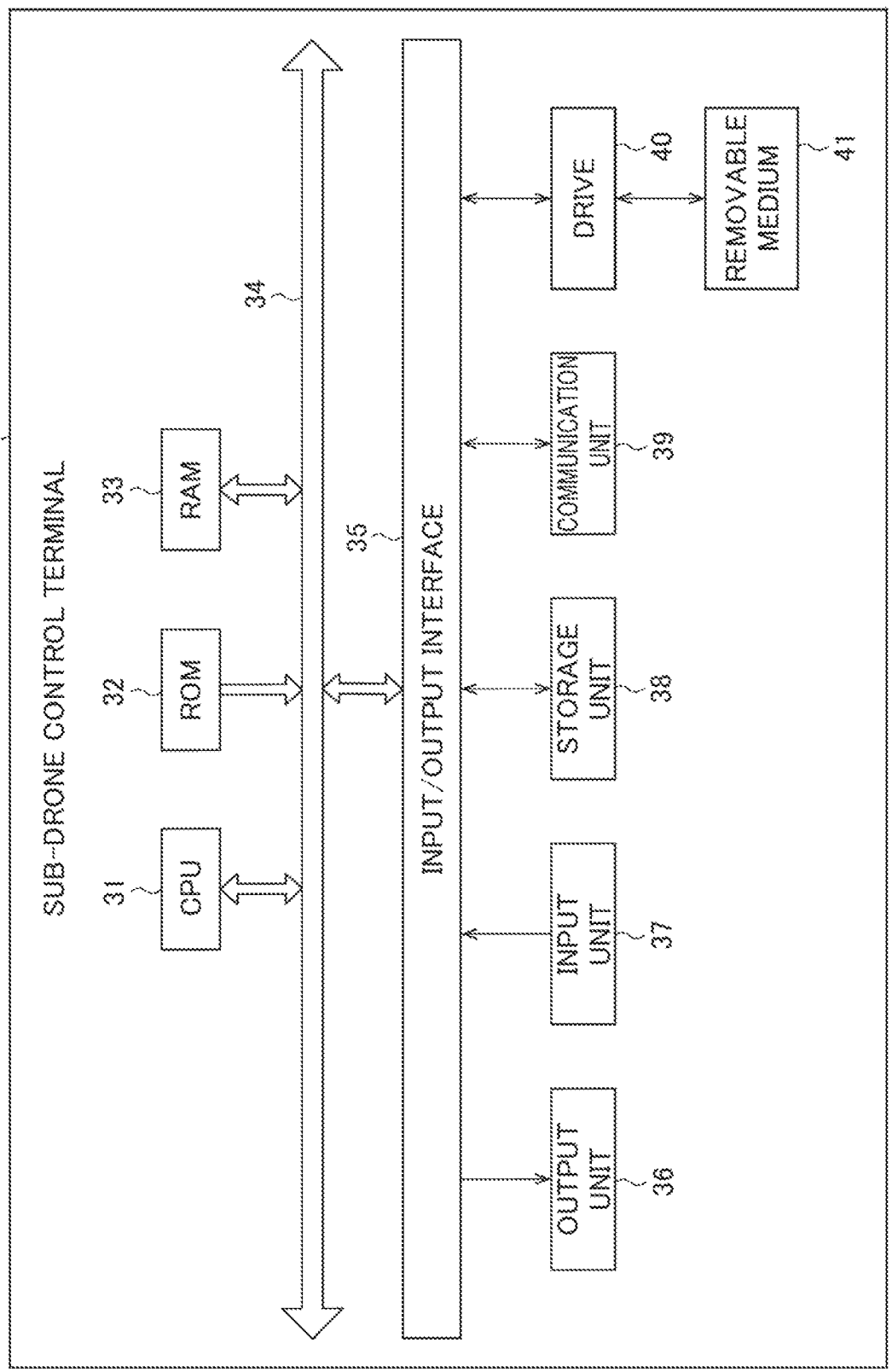
FIG. 4 is a block diagram illustrating an example of a hardware configuration of a sub-drone control terminal in the flight system illustrated in FIG. 2.

FIG. 4 is a block diagram illustrating an example of a hardware configuration of the sub-drone control terminal in the flight system illustrated in FIG. 2.

The sub-drone control terminal 3 includes a CPU 31, a ROM 32, a RAM 33, a bus 34, an input/output interface 35, an output unit 36, an input unit 37, a storage unit 38, a communication unit 39, and a drive 40.

The CPU 31 executes various kinds of processing in accordance with a program recorded in the ROM 32 or a program loaded on the RAM 83 from the storage unit 38. Information necessary for the CPU 31 to execute various kinds of processing is appropriately stored in the RAM 33.

The CPU 31, the ROM 32, and the RAM 33 are connected to each other through the bus 34. The input/output interface 35 is also connected to the bus 34. The output unit 36, the input unit 37, the storage unit 38, the communication unit 39, and the drive 40 are connected to the input/output interface 35.

The output unit 36 is constituted by various liquid crystal displays or the like, and outputs various pieces of information. The input unit 37 is constituted by various hardware buttons or the like, and inputs various pieces of information. The storage unit 38 is constituted by a hard disk, a DRAM, or the like, and stores various pieces of information. The communication unit 39 controls communication with other devices (for example, the sub-drone 1, the main drone control terminal 4 illustrated in FIG. 2, or the like) in accordance with a method conforming to standards of Bluetooth (registered trademark), NFC (registered trademark), or the like, a method through the network N including the Internet, or the like.

The drive 40 is provided in correspondence with necessity. A removable medium 41 that is constituted by a magnetic disk, an optical disc, a magneto-optical disc, a semiconductor memory, or the like is appropriately mounted to the drive 40. A program that is read out from the removable medium 41 by the drive 40 is installed in the storage unit 48 in accordance with necessity. In addition, the removable medium 41 can also store the various pieces of information stored in the storage unit 38 as in the storage unit 38.

Note that, basically, hardware configurations of the main drone 2 and the main drone control terminal 4 can be set in a similar manner as in the hardware configurations of the sub-drone drone 1 and the sub-drone control terminal 3, and thus description thereof will be omitted here.

For example, execution of landing support processing can be executed by cooperation of various kinds of hardware and various kinds of software of the sub-drone 1, the main drone 2, the sub-drone control terminal 3, and the main drone control terminal 4. The landing support processing represents a series of processing that is performed until the sub-drone 1 flies prior to landing of the main drone 2, acquires environmental information such as a wind direction and a wind speed, and movement of the main drone 2 for landing is controlled on the basis of the environmental information acquired by the sub-drone 1. In addition, hereinafter, a "position" represents a position expressed by three-dimensional coordinates in a predetermined three-dimensional coordinate system unless otherwise stated. That is, the "position" is a concept including not only a two-dimensional plane such as latitude and longitude, but also a height from a ground surface (the ground G in FIG. 1).

Figure 5:
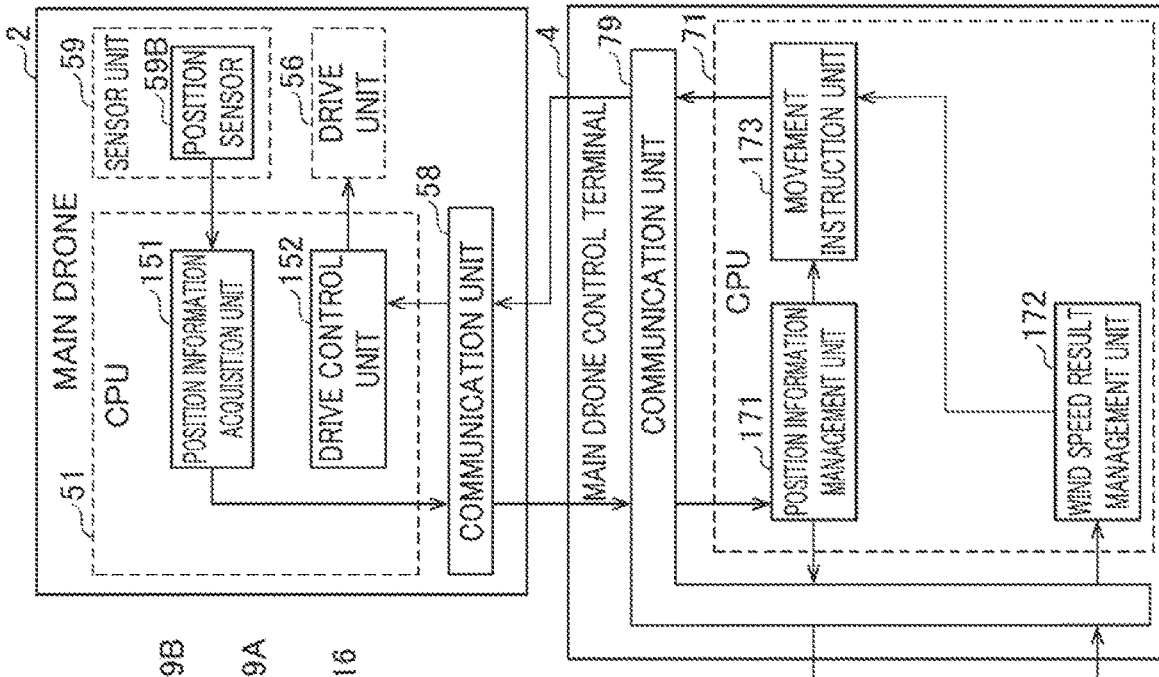
FIG. 5 is a functional block diagram illustrating an example of a functional configuration of the flight system illustrated in FIG. 2.
Figure 5:
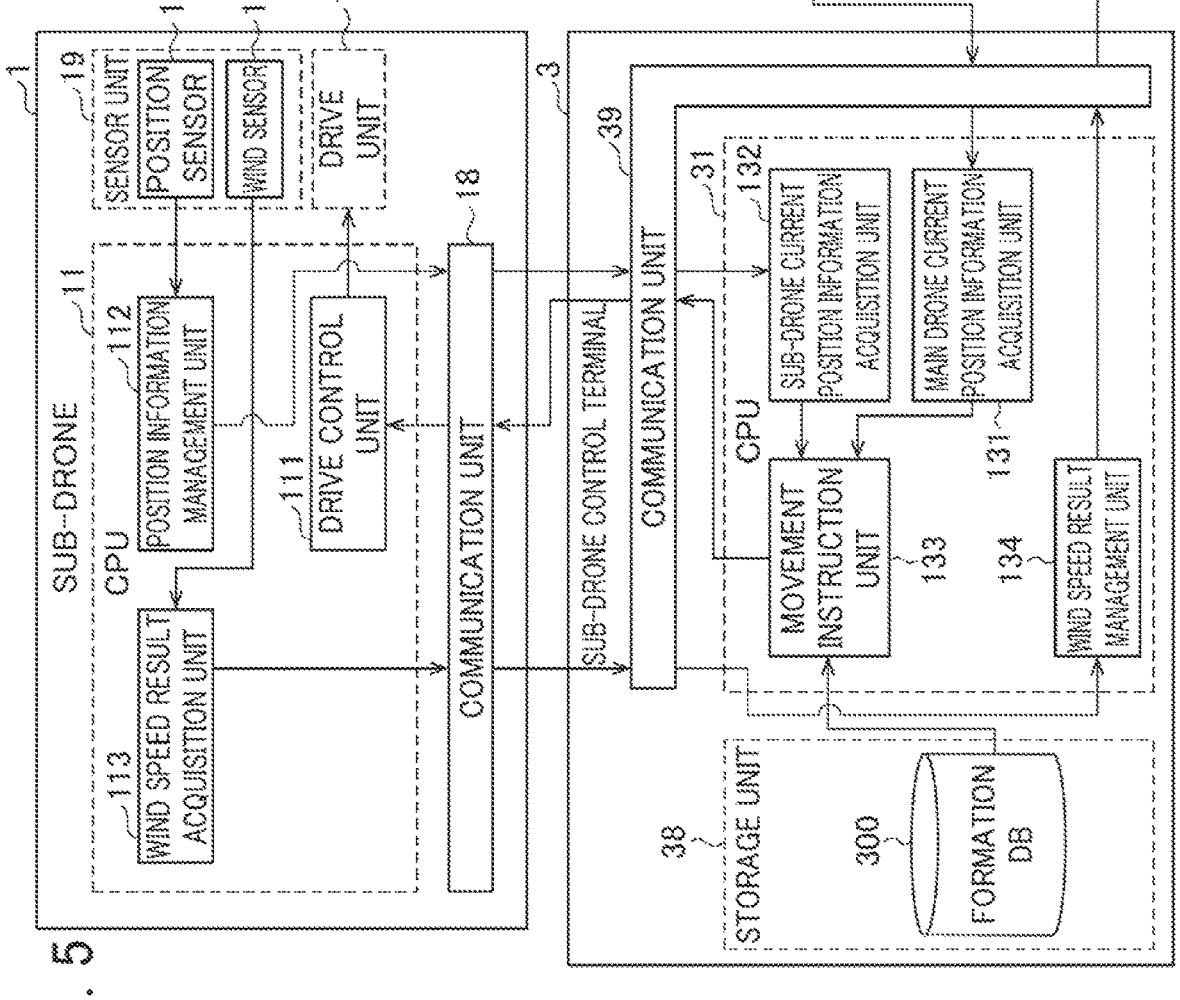

FIG. 5 is a functional block diagram illustrating an example of a functional configuration capable of realizing the landing support processing among the functional configurations of the flight system illustrated in FIG. 2. Hereinafter, an example of a functional configuration of each of the sub-drone 1, the sub-drone control terminal 3, the main drone control terminal 4, and the main drone 2 will be individually described in this order.

First, an example of a functional configuration of the sub-drone 1 will be described. As illustrated in FIG. 5, in the CPU 11 of the sub-drone 1, a drive control unit 111, a position information management unit 112, and a wind speed result acquisition unit 113 function.

The drive control unit 111 acquires movement instruction transmitted from the sub-drone control terminal 3 through the communication unit 18. Specifically, for example, information relating to a "moving direction" and a "movement speed" or the like is included in the movement instruction. The drive control unit 111 adjusts a rotation direction or a rotation speed of a propeller (motor) (not illustrated) by driving the drive unit 16 on the basis of the acquired information relating to the "moving direction" and the "speed", and moves the sub-drone 1. Note that, a method of moving the sub-drone 1 to a designated position or direction is not particularly limited, and various methods are applicable.

The position information management unit 112 acquires a current position of the sub-drone 1 which is measured by the position sensor 19B, and transmits the current position to the sub-drone control terminal 3 through the communication unit 18. Although details will be described later, in the sub-drone control terminal 3, a movement instruction is generated on the basis of a difference between a current position and movement position of the sub-drone 1, and the movement instruction is transmitted to the sub-drone 1. Here, in this embodiment, as to be described later, the movement position of the sub-drone 1 is determined by the sub-drone control terminal 3 on the basis of a current position or a predicted position of the main drone 2. That is, the movement instruction of the sub-drone 1 is determined with the current position or the predicted position of the main drone 2 set as a reference. The drive control unit 111 of the sub-drone 1 moves the sub-drone 1 to the movement position in accordance with the movement instruction. In other words, the drive control unit 111 moves the sub-drone 1 to the movement position with the current position or the predicted position of the main drone 2 set as a reference.

The wind speed result acquisition unit 113 acquires information indicating a wind direction and a wind speed which are measured by the wind sensor 19A at the current position (movement position) of the sub-drone 1 as environmental information. The wind speed result acquisition unit 113 transmits the acquired environmental information to the sub-drone control terminal 3 through the communication unit 18. Although details will be described later, the environmental information is transmitted from the sub-drone control terminal 3 to the main drone control terminal 4. Here, the main drone control terminal 4 gives the movement instruction for the main drone 2 in consideration of an influence of wind (the wind direction and the wind speed) at the movement position of the sub-drone 1 which is determined with the current position or the predicted position of the main drone 2 set as a reference. According to this, the main drone 2 can perform flight with the influence of wind reduced, and as a result, the main drone 2 can land at an originally scheduled landing point.

Figure 7:
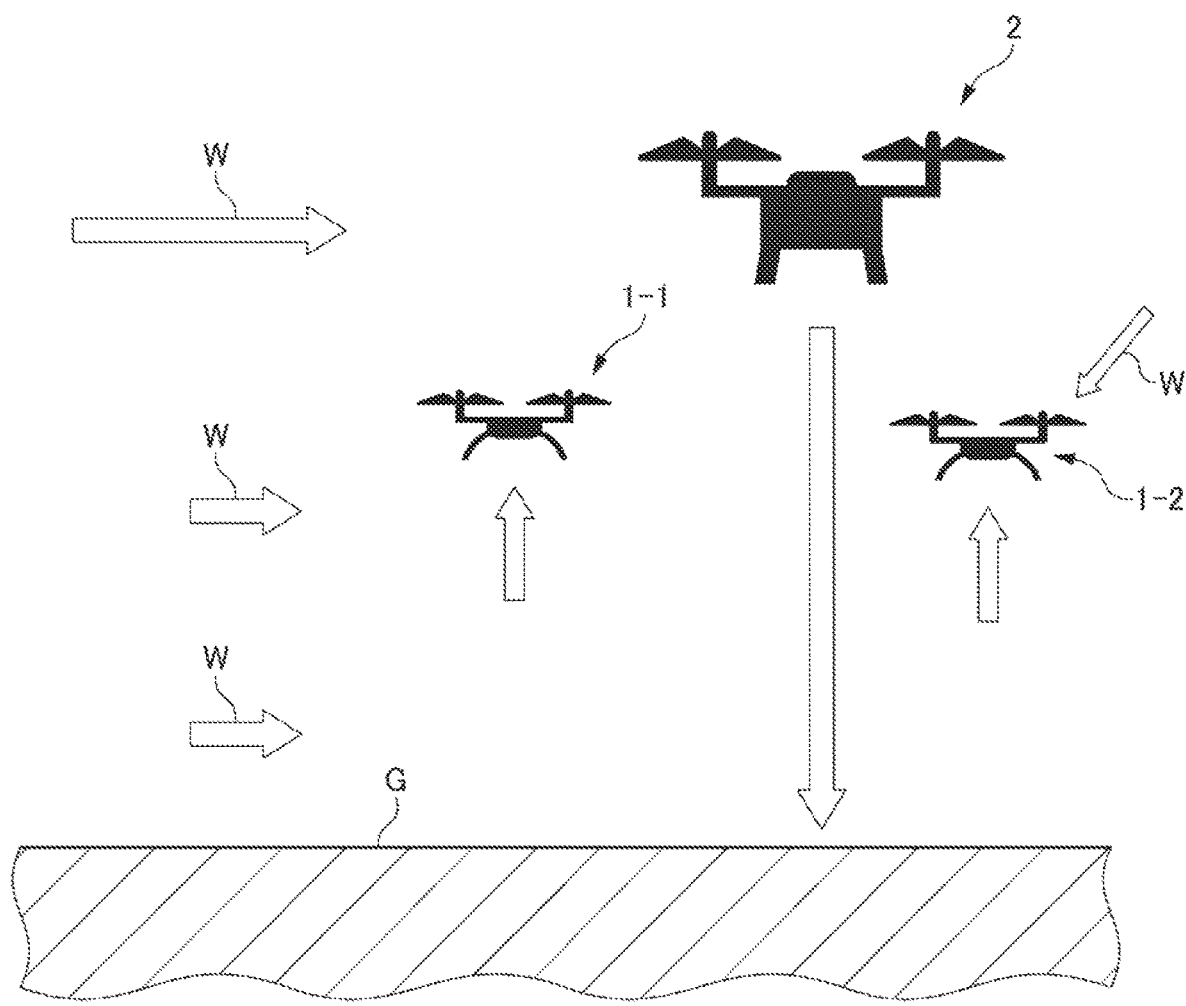
FIG. 7 is a diagram illustrating an outline of a mobile object of which movement is controlled by the flight system according to the embodiment of the information processing system of the invention, and illustrating an example different from the example illustrated in FIG. 1.

Next, an example of a functional configuration of the sub-drone control terminal 3 that controls flight of the sub-drone 1 will be described. In the CPU 31 of the sub-drone control terminal 3, a main drone current position information acquisition unit 131, a sub-drone current position information acquisition unit 132, a movement instruction unit 133, and a wind speed result management unit 134 function. Note that, as illustrated in FIG. 7 to be described later, in a case where a plurality of the sub-drones 1 exist, a formation DB 300 is provided in a region of the storage unit 38.

The main drone current position information acquisition unit 131 acquires a current position of the main drone 2 from the main drone control terminal 4 through the communication unit 39, and provides the current position to the movement instruction unit 133.

The sub-drone current position information acquisition unit 132 acquires a current position of the sub-drone 1 from the sub-drone 1 through the communication unit 39, and provides the current position to the movement instruction unit 133.

The movement instruction unit 133 determines a movement position of the sub-drone 1, for example, on the basis of the current position of the main drone 2 so as to execute movement control of the sub-drone 1 that is a mobile object on the basis of a state of the main drone 2 that is a flying object. That is, in this example, as an example of a state of the main drone 2, the current position of the main drone 2 is employed. Here, a method of determining the movement position of the sub-drone 1 is not particularly limited, and for example, the following methods can be employed. Specifically, for example, the movement instruction unit 133 can determine the movement position of the sub-drone 1 to a position where a relative position with the main drone 2 becomes constant. In addition, for example, the movement instruction unit 133 can determine a position on a windward side with respect to the main drone 2 as the movement position of the sub-drone 1. That is, in this example, as an example of a state of the main drone 2, the current position of the main drone 2, and a state in which the main drone 2 is influenced by the wind W from an arbitrary direction are employed. More specifically, the movement instruction unit 133 may determine a scheduled movement position of the sub-drone 1 on the basis of the current position of the main drone 2, and may determine the scheduled movement position, for example, on the basis of a predicted position of the main drone 2 after several seconds, or the like. That is, in this example, as an example of the state of the main drone 2, a predicted position (an arbitrary route is set) at which the main drone 2 may exist after passage of predetermined time is employed. In summary, as the state of the main drone 2 that is a mobile object, various states can be employed, and for example, in the above-described example, the current position of the main drone 2, the current position of the main drone 2 and a state in which the main drone 2 is influenced by wind from a predetermined direction, a predicted position at which the main drone 2 may exist after passage of arbitrary time (for example, after five seconds, or after ten seconds), and the like are employed.

In addition, the movement instruction unit 133 generates the movement instruction for the sub-drone 1 on the basis of a difference between the current position and the movement position of the sub-drone 1, and transmits the movement instruction to the sub-drone 1 through the communication unit 39.

Note that, although details will be described later with reference to FIG. 7, it is not necessary for the sub-drone 1 to be set to one, and a plurality of the sub-drones 1 may exist. In this case, the movement instruction unit 133 generates the movement instruction for each of the plurality of sub-drones 1, using the formation DB 300 or the like.

The wind speed result management unit 134 acquires the environmental information (information indicating a wind direction and a wind speed at the current position (movement position) of the sub-drone 1) transmitted from the sub-drone 1 through the communication unit 39. The wind speed result management unit 134 transmits the environmental information to the main drone control terminal 4 through the communication unit 39. Note that, in a case where types of information used by the sub-drone control terminal 3 and the main drone control terminal 4 are different, or the like, the wind speed result management unit 134 may process the environmental information to change the environmental information into a type capable being used by the main drone control terminal 4, and may transmit the resultant environmental information to the main drone control terminal 4 through the communication unit 39. In addition, in this embodiment, the control device of the main drone 2 may be provided separately from the main drone 2 as the main drone control terminal 4 or may be mounted (embedded) in the main drone 2. In this case, the environmental information or the processed information thereof is transmitted to the main drone 2. In summary, the wind speed result management unit 134 can execute control of transmitting measurement information or processed information thereof to the main drone control terminal 4.

Hereinbefore, description has been given of an example of the functional configuration of the sub-drone 1 and the sub-drone control terminal 3. Next, an example of a functional configuration of the main drone 2 and the main drone control terminal 4 will be described.

First, in a CPU 71 of the main drone control terminal 4, a position information management unit 171, a wind speed result management unit 172, and a movement instruction unit 173 function.

The position information management unit 171 acquires a current position of the main drone 2 from the main drone 2 through the communication unit 79, provides the current position to the movement instruction unit 173, and transmits the current position to the sub-drone control terminal 3 through the communication unit 19. Note that, as described above, the current position of the main drone 2 can be used as a reference position in the sub-drone control terminal 3 when determining the movement position of the sub-drone 1.

The wind speed result management unit 172 acquires the environmental information (information indicating a wind direction and a wind speed at the current position (movement position) of the sub-drone 1) transmitted from the sub-drone control terminal 3 or processed information thereof through the communication unit 79. Note that, as to be described later with reference to FIG. 7 or the like, in a case where a plurality of the sub-drones 1 may exit. In this case, the wind speed result management unit 172 may acquire the environmental information or the processed information thereof for each of the plurality of sub-drones. According to this, the main drone control terminal 4 can acquire the environmental information or the like measured at a plurality of locations, and thus it is possible to more accurately understand an actual influence of wind, and as a result, it is possible to more accurately assist taking-off and landing of the main drone 2.

The movement instruction unit 173 determines a movement position of the main drone 2, generates a movement instruction for the main drone 2 on the basis of a difference between the movement position and the current position of the main drone 2, and transmits the movement instruction to the main drone 2 through the communication unit 79. Here, the movement instruction unit 173 recognizes a wind direction and a wind speed at the current position (movement position) of the sub-drone 1 from the environmental information or the processed information, and generates a movement instruction for the main drone 2 in consideration of the recognition result. Specifically, for example, it is assumed that information relating to a "moving direction" and a "speed" or the like is included as the movement instruction as in the sub-drone 1. In addition, it is assumed that the movement instruction unit 173 recognizes strong (fast wind speed) wind in a direction from west to east from the environmental information or the processed information in a flight route up to landing of the main drone 2. In this case, for example, the movement instruction unit 173 determines not only a downward direction but also a direction from east to west (a direction opposite to the wind direction) as the "moving direction", and determines not only a speed in the downward direction but also a speed in the direction from east to west (a direction opposite to the wind direction) as the "speed". When flying in accordance with the movement instruction, the main drone 2 can descent (without drifting in the direction from west to east) in a state of reducing an influence of wind, and as a result, the main drone 2 can land at an original landing point.

In the CPU 51 of the main drone 2 for which flight is controlled by the main drone control terminal 4, a position information acquisition unit 151 and a drive control unit 152 function.

The position information acquisition unit 151 acquires a current position of the main drone 2 which is measured by a position sensor 59B, and transmits the current position to the main drone control terminal 4 through a communication unit 58.

The drive control unit 152 acquires the movement instruction transmitted from the main drone control terminal 4 through the communication unit 58. Specifically, for example, information relating a "moving direction" and a "speed" or the like is included in the movement instruction. The drive control unit 152 adjusts a rotation direction or a rotation speed of the propeller (motor) (not illustrated) by driving a drive unit 56 on the basis of the acquired information relating to the "moving direction" and the "speed", and moves the main drone 2. Note that, a method of moving the main drone 2 to a designated position or direction is not particularly limited, and various methods are applicable.

Figure 6:
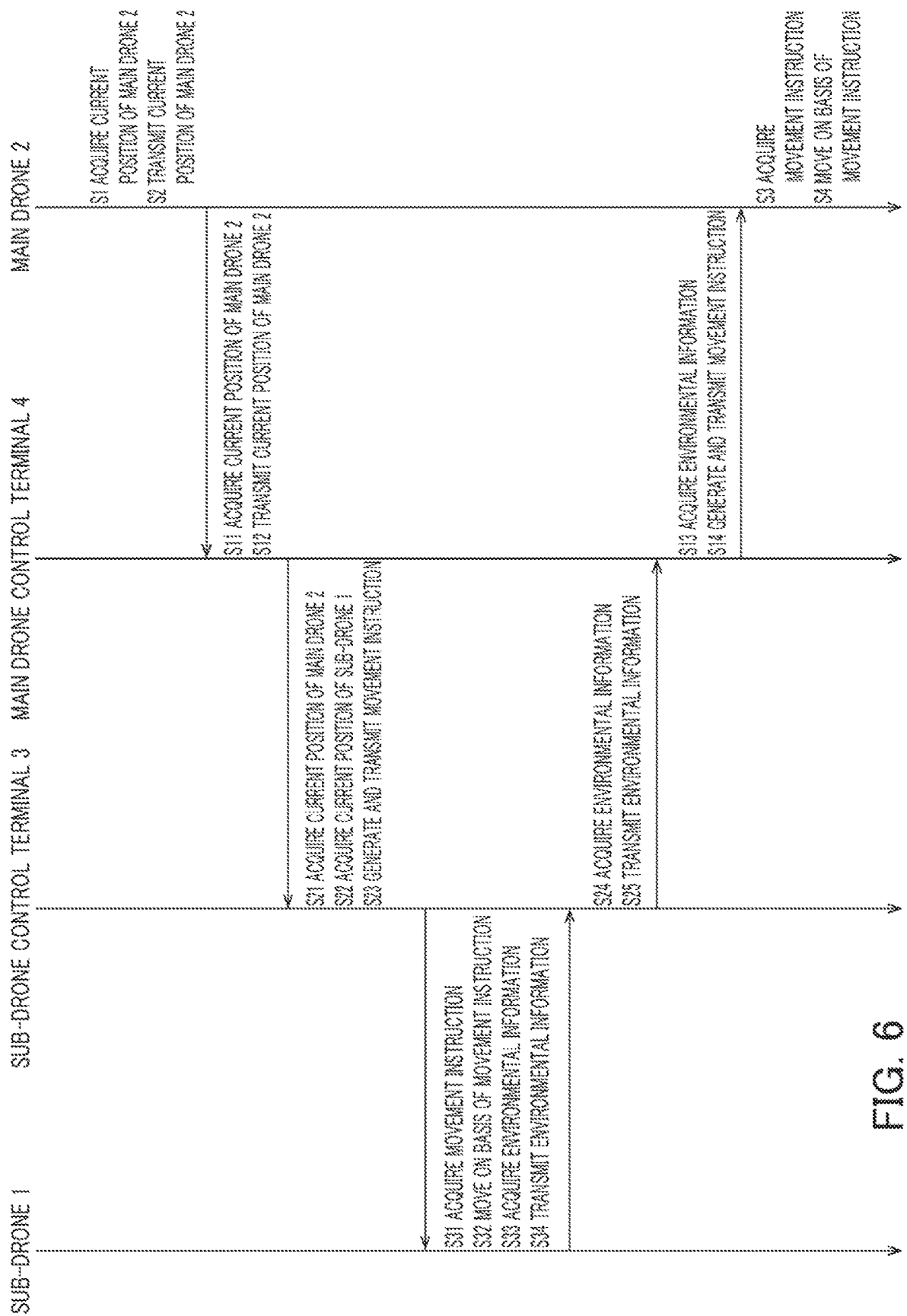
FIG. 6 is a sequence diagram illustrating a flow of landing support processing executed in the flight system having the functional configuration illustrated in FIG. 5.

FIG. 6 is a sequence diagram illustrating a flow of the landing support processing executed in the flight system having the functional configuration illustrated in FIG. 5.

In step S1, the position information acquisition unit 151 of the main drone 2 acquires a current position of the main drone 2. In step S2, the position information acquisition unit 151 of the main drone 2 transmits the current position of the main drone 2 to the main drone control terminal 4.

In step S11, the position information management unit 171 of the main drone control terminal 4 acquires the current position of the main drone 2 which is transmitted in step S2 through the communication unit 58. In step S12, the position information management unit 171 of the main drone control terminal 4 transmits current position information of the main drone 2 to the sub-drone control terminal 3.

In step S21, the main drone current position information acquisition unit 131 of the sub-drone control terminal 3 acquires the current position of the main drone 2 which is transmitted in step S12. In step S22, the sub-drone current position information acquisition unit 132 of the sub-drone control terminal 3 acquires a current position of the sub-drone 1. In step S23, the movement instruction unit 133 of the sub-drone control terminal 3 generates a movement instruction of the sub-drone 1 on the basis of the current position of the main drone 2 which is acquired in step S21 and the current position of the sub-drone 1 which is acquired in a step S22, and transmits the movement instruction to the sub-drone 1.

In step S31, the drive control unit 111 of the sub-drone 1 acquires the movement instruction information transmitted in step S23. In step S32, the drive control unit 111 of the sub-drone 1 causes the drive unit 16, in accordance with the movement instruction acquired in step S31, to move the sub-drone 1. In step S33, the wind speed result acquisition unit 113 of the sub-drone 1 acquires a wind direction or a wind speed at a point to which the sub-drone 1 is moved in step S32 as environmental information. In step S34, the wind speed result acquisition unit 113 of the sub-drone 1 transmits the environmental information to the sub-drone control terminal 3.

In step S24, the wind speed result management unit 134 of the sub-drone control terminal 3 acquires the environmental information from the sub-drone 1. In step S25, the wind speed result management unit 134 of the sub-drone control terminal 3 transmits the environmental information to the main drone control terminal 4.

In step S13, the wind speed result management unit 172 of the main drone control terminal 4 acquires the environmental information from the sub-drone control terminal 3. In step S14, the movement instruction unit 173 of the main drone control terminal 4 generates a movement instruction for the main drone 2 on the basis of the environmental information acquired in step S13 and the current position of the main drone 2, and transmits the movement instruction to the main drone 2. Note that, the current position of the main drone 2 may be a position acquired at timing in step S12, or may be a position acquired at the subsequent timing (not illustrated in FIG. 6).

In step S3, the drive control unit 152 of the main drone 2 acquires the movement instruction. In step S4, the drive control unit 152 of the main drone 2 causes the drove unit 56, in accordance with the movement instruction, to move the main drone 2.

When the landing support processing in FIG. 6 is repeatedly executed, the influence of the environment (wind) on the main drone 2 is reduced, and thus the main drone 2 can land at an appropriate position.

Note that, description has been given of only landing of the main drone 2 for convenience of explanation, but taking-off of the main drone 2 can be realized by executing similar processing as in the processing in landing except that the sub-drone 1 is previously moved to an upward side of the main drone 2.

In the first embodiment, in the example illustrated in FIG. 1 to FIG. 6, description has been given of an example of a case where one sub-drone is caused to fly with respect to taking-off and landing of the main drone 2. However, as described above, a plurality of the sub-drones 1 may be caused to fly with respect to the one main drone 2. Here, description will be given of an example of a case where the plurality of sub-drone 1 are caused to fly with respect to the main drone 2 with reference to FIG. 7 and FIG. 8.

FIG. 7 is a diagram illustrating an outline of a mobile object of which movement is controlled by the flight system according to the embodiment of the information processing system of the invention, and illustrating an example different from the example illustrated in FIG. 1. In the example illustrated in FIG. 7, two sub-drones 1-1 and 1-2 are flying to assist landing of the main drone 2. In this case, although not illustrated in FIG. 7, it is assumed that flight of the sub-drones 1-1 and 1-2 is controlled by the one sub-drone control terminal 3. Note that, the configuration is illustrative only, and the flight system may be configured to include n (n is an integer value of one or greater) sub-drones 1, and m (m is an integer value of one or greater which is independent from n) sub-drone control terminals 3.

As illustrated in FIG. 7, a wind direction or a wind speed of wind W is not always constant during taking-off and landing of the main drone 2, and may be different depending on an existence position (existence timing even in the same existence position) of the main drone 2. In this case, a case is also assumed where only environmental information (information indicating a wind direction or a wind speed) measured in the one sub-drone 1 may not be sufficient for accurately assisting the taking-off and landing of the main drone 2 by reducing an influence of the wind W. Here, when a plurality of the sub-drones 1 are caused to fly to acquire environmental information at respective locations, even in a case where properties (a wind direction or a wind speed) of the wind W varies in a complicated manner, it is possible to perform assistance of taking-off and landing by reflecting the properties in real time. In the example illustrated in FIG. 7, unlike the example illustrated in FIG. 1, there is also wind with a slow wind speed in a direction from northeast to southwest as the wind W in addition to wind in a direction from west to east. Accordingly, the sub-drone 1-1 and the sub-drone 1-2 which are previously disposed with respect to the main drone 2 acquire a plurality of pieces of environmental information which are completely different from each other. Specifically, the sub-drone 1-1 acquires environmental information indicating that the wind direction is a direction from west to east and the wind speed is relatively fast. On the other hand, the sub-drone 1-2 acquires environmental information indicating that the wind direction is a direction from northeast to southwest, and the wind speed is relatively slow.

When the main drone control terminal 4 can acquire a plurality of pieces of the environmental information which are acquired at a plurality of sites, the main drone control terminal 4 can generate a movement instruction, on which an actual influence of the wind W is more accurately reflected, with respect to the main drone 2. As a result, the main drone 2 can more accurately move to a scheduled movement position (a scheduled landing point or the like).

Specifically, for example, a camera (not illustrated) may be provided on a bottom surface portion of the main drone 2 in some cases. The camera captures an image (a still image or a moving image) that includes a landing position in a subject so as to confirm a landing position on the ground G. The main drone control terminal 4 executes flight control for causing the main drone 2 to land at the landing position on the basis of data of the image. However, in a case where the main drone 2 is shaken due to an influence of wind and fluctuation in a horizontal direction occurs, control based on the data of the image may be difficult. Here, as illustrated in FIG. 7, when environmental information is acquired from various positions by the plurality of sub-drones 1, and flight control of the main drone 2 is realized to remove the fluctuation in the horizontal direction on the basis of the environmental information, it is possible to appropriately execute control based on the data of the image. As a result, safe landing of the main drone 2 becomes possible.

Figure 8:
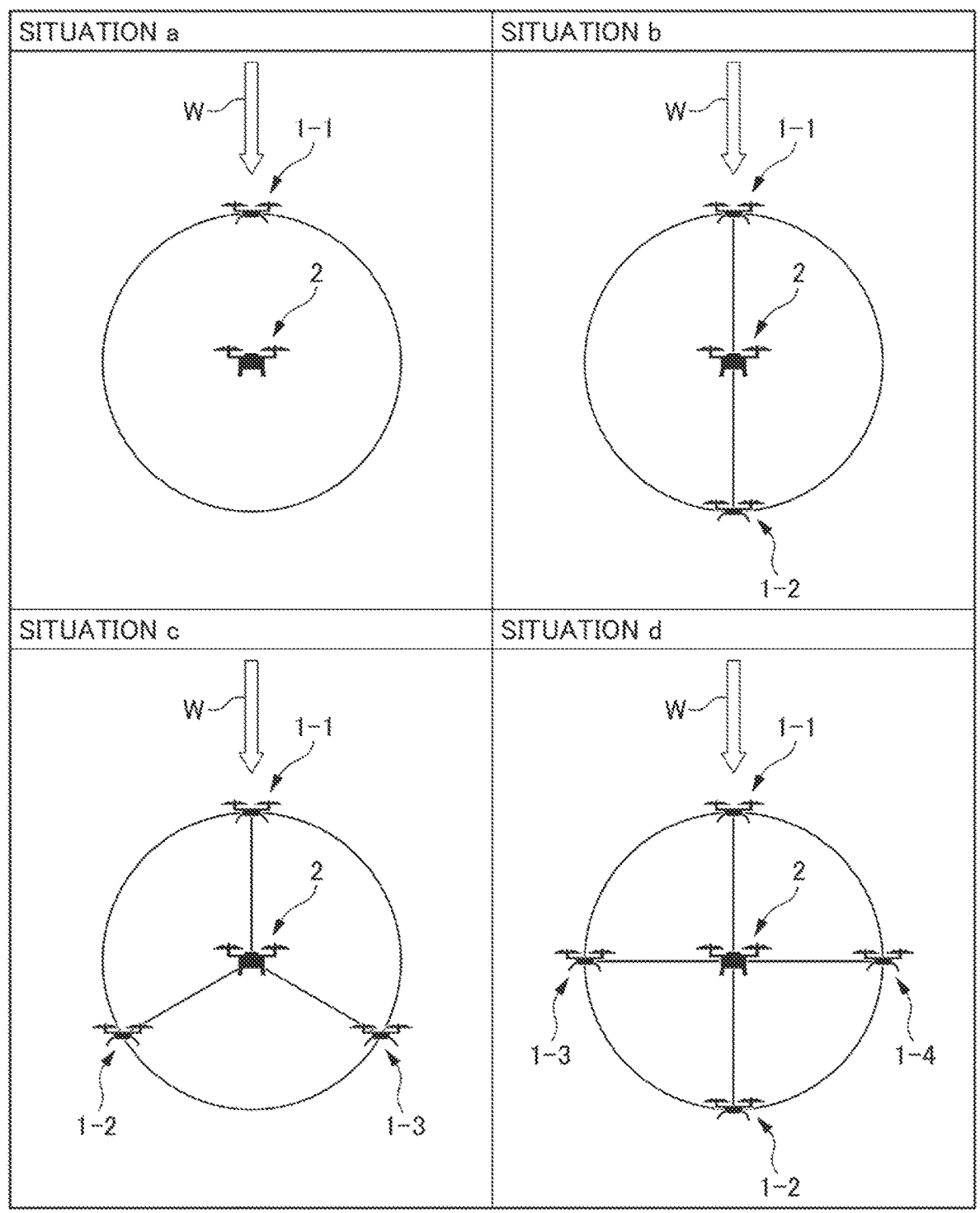
FIG. 8 is a diagram illustrating an example of an arrangement position of the sub-drone.

Next, an arrangement example (formation) of the sub-drone 1 will be described briefly with reference to FIG. 8. FIG. 8 is a diagram illustrating an example of an arrangement position of the sub-drone.

In the example illustrated in FIG. 8, an arrangement example of four patterns including Situation a, Situation b, Situation c, and Situation d. Specifically, Situation a illustrates an example of a two-dimensional horizontal positional relationship of one sub-drone 1-1 with respect to the main drone 2. Situation b illustrates an example of a two dimensional horizontal positional relationship of two sub-drones 1-1 and 1-2 with respect to the main drone 2. Situation c illustrates an example of a two-dimensional horizontal positional relationship of three sub-drones 1-1, 1-2, and 1-3 with respect to the main drone 2. Situation d illustrates an example of a two-dimensional horizontal positional relationship of four sub-drones 1-1, 1-2, 1-3, and 1-4 with respect to one main drone 2.

Situation a in FIG. 8 illustrates an arrangement example in which the sub-drone 1-1 is arranged at a position that is spaced apart from the main drone 2 by a constant distance in the horizontal direction. Note that, in Situation a in FIG. 8 the sub-drone 1-1 is located on a windward side when seen from the main drone 2, and thus the sub-drone 1-1 can acquire environmental information at a windward position. Here, for example, the sub-drone 1-1 may be fixed relatively to the main drone 2. However, the sub-drone 1-1 may be spaced apart from the main drone 2 by a constant distance and may make a circular motion around the main drone 2. In addition, for example, in Situation a in FIG. 8, since wind W is blowing in one direction toward the main drone 2, the sub-drone 1-1 may retrieve a windward position after movement so as to make a circular motion around the main drone 2, and when the windward position is specified, the sub-drone 1 may be fixed at the position. In this case, even with the one sub-drone 1-1, it is possible to acquire environmental information at various positions spaced apart from the main drone 2 by a constant distance.

Situation b in FIG. 8 illustrates an arrangement example in which the sub-drones 1-1 and 1-2 are respectively arranged at positions spaced apart from the center of the main drone 2 by a constant distance. Specifically, for example, in Situation b in FIG. 8, the sub-drones 1-1 and 1-2 are respectively arranged at positions spaced apart from the main drone 2 by a constant distance with intervals of 180° with the main drone 2 set as a center. As described above, in Situation b in FIG. 8, the sub-drone 1-1 is arranged on a windward side when seen from the main drone 2, and the sub-drone 1-2 is arranged on a leeward side when seen from the main drone 2. According to this, the main drone control terminal 4 can simultaneously acquire environmental information at respective positions on the windward side and the leeward side.

Situation c in FIG. 8 illustrates an arrangement example in which the sub-drones 1-1, 1-2, and 1-3 are respectively arranged at positions spaced apart from the center of the main drone 2 by a constant distance. Specifically, for example, in Situation c in FIG. 8, the sub-drones 1-1, 1-2, and 1-3 are respectively arranged at positions spaced apart from the main drone 2 by a constant distance with intervals of 120° with the main drone 2 set as a center. As described above, in Situation c in FIG. 8, the sub-drone 1-1 is arranged on a windward side when seen from the main drone 2, the sub-drone 1-2 is arranged on a rear-left leeward side in the same drawing when seen from the main drone 2, and the sub-drone 1-3 is arranged on a rear-right leeward side in the same drawing when seen from the main drone 2. Accordingly, the main drone control terminal 4 can simultaneously acquire environmental information at positions in three directions including the position on the windward side.

Situation d in FIG. 8 illustrates an arrangement example in which the sub-drones 1-1, 1-2, 1-3, and 1-4 are respectively arranged at positions spaced apart from the center of the main drone 2 by a constant distance. Specifically, for example, Situation d in FIG. 8, the sub-drones 1-1, 1-2, 1-3, and 1-4 are respectively arranged at positions spaced apart from the main drone 2 by a constant distance with intervals of 90° with the main drone 2 set as a center. As described above, in Situation d in FIG. 8, the sub-drone 1-1 is arranged on a windward side when seen from the main drone 2, the sub-drone 1-2 is arranged on a leeward side when seen from the main drone 2, the sub-drone 1-3 is arranged on a left side in the same drawing when seen from the main drone 2, and the sub-drone 1-4 is arranged on a right side in the same drawing when seen from the main drone 2. Accordingly, the main drone control terminal 4 can simultaneously acquire environmental information at positions in four directions including the position on the windward side.

Here, the arrangements of the sub-drone 1 in Situation a to Situation d in FIG. 8 are illustrative only. For example, even when the number of the sub-drones 1 is the same in each case, a different formation may be provided. Specifically, for example, in Situation b in FIG. 8, the two sub-drones 1-1 and 1-2 are arranged at positions spaced apart from the main drone 2 by a constant distance with intervals of 180°, but this arrangement may be one among a plurality of formations. That is, one or more formations different from Situation b in FIG. 8 may be separately provided. For example, a formation in which the sub-drone 1-1 is located on the windward side when seen from the main drone 2, and the sub-drone 1-2 is located on a right side, a left side, or the like in the drawing at which the distance from the main drone 2 is different from the distance in the sub-drone 1 instead of the leeward side. That is, an arbitrary formation may be provided in an arbitrary number of pieces as long as the sub-drone 1 can acquire environmental information within a constant range from the main drone 2. When a plurality of the formations are provided and the formations are appropriately changed in correspondence with an environment (wind), the sub-drone control terminal 3 can understand the environmental information within a constant range in detail. As a result, it is possible to realize appropriate control of the main drone 2 in which an influence of an environment is further reduced.

In addition, in Situation a to Situation d in FIG. 8, description has been given of an arrangement example of the sub-drone 1 in two-dimensions in the horizontal direction.

Here, with regard to the arrangement of the sub-drone 1, it is necessary to consider not only a two-dimensional height in the horizontal direction but also a three-dimensional height of the sub-drone 1 and the main drone 2. In this case, it is not particularly necessary for the sub-drone 1 to be located at the same height as that of the main drone 2, and it is also not particularly necessary for the sub-drone 1 to be located at the same height as that of another sub-drone 1. For example, with regard to Situation d, each of the sub-drones 1-1, 1-2, 1-3, and 1-4 can fly at a different height. According to this, the main drone control terminal 1 can simultaneously acquire pieces of environmental information in different heights.

Here, an example of an arrangement method of each of the plurality of sub-drones 1 will be described. For example, in the case of employing the functional configuration in the example illustrated in FIG. 5, the following formation information is stored in a formation DB 300. In a case where a plurality of the sub-drones 1 exist, the formation information is information indicating a pattern that indicates an arrangement relationship of the sub-drones 1. For example, the formation information includes information indicating a relative position of each of the sub-drones 1 with a current position or a predicted position of the main drone 2 set as a reference. Specifically, for example, information capable of specifying the content of each of Situation a, Situation b, Situation c, and Situation d as illustrated in FIG. 8 is stored in the formation DB 300 as formation information of each of Situation a, Situation b, Situation c, and Situation d. In this case, the movement instruction unit 133 of the sub-drone control terminal 3 extracts formation information of an arbitrary formation (for example, Situation d) from the formation DB 300. In addition, the movement instruction unit 133 determines a movement position (for example, positions of the sub-drones 1-1, 1-2, 1-3, and 1-4 illustrated in FIG. 8 in the case of Situation d) of the sub-drone 1 on the basis of the formation information and a current position of the main drone 2. In addition, the movement instruction unit 133 generates a movement instruction for each of the plurality of sub-drones 1 on the basis of a difference between a current position and a movement position of each of the plurality of sub-drones 1 (for example, in the case of Situation d, positions of the sub-drones 1-1, 1-2, 1-3, and 1-4 illustrated in FIG. 8), and transmits the movement instruction to each of the plurality of sub-drones 1 through the communication unit 39.

Note that, the method using the formation information as the arrangement method of each of the plurality of sub-drones 1 is illustrative only, and various other methods can be employed. For example, it is possible to employ a method of determining a scheduled movement position of second or later sub-drones 1 in accordance with wind (a wind direction or a wind speed).

Second Embodiment

The sub-drone 1 of the first embodiment is configured to support the main drone 2 taking-off and landing. In contrast, a sub-drone 1 of a second embodiment is configured to support the main drone 2 in typical flight.

Even in the typical flight, the main drone 2 is susceptible to an environment such as wind as in the taking-off and landing. Accordingly, in a poor environment location such as a case where strong wind is blowing, it is difficult for the main drone 2 to secure safety of flight, and thus it is preferable that the location is excluded from a movement route up to a destination. Here, in the second embodiment, a plurality of the sub-drones 1 previously move to respective positions (respective predicted positions) which may be a route of the main drone 2, acquire environmental information, and transmit the environmental information to the main drone control terminal 4. The main drone control terminal 4 retrieves a safe position with less influence of an environment in flight of the main drone 2 on the basis of the environmental information of each of the positions. The main drone control terminal 4 determines an optimal movement route on the basis of the safe positons. When moving along the movement route determined as described above, the main drone 2 can move to a destination without being influenced by the environment.

Here, a configuration of the flight system of the second embodiment can be set in a similar manner as in the configuration in FIG. 2 according to the first embodiment. That is, the flight system of the second embodiment also includes the sub-drone 1, the main drone 2, the sub-drone control terminal 3, and the main drone control terminal 4. However, it is assumed that a plurality of the sub-drones 1 exist in the second embodiment. Hardware configurations of the sub-drone 1, the main drone 2, the sub-drone control terminal 3, and the main drone control terminal 4 in the second embodiment are similar to the configurations in the first embodiment illustrated in FIG. 3 or FIG. 4.

For example, execution of flight support processing becomes possible in cooperation of various kinds of hardware and various kinds of software of the sub-drone 1, the main drone 2, the sub-drone control terminal 3, and the main drone control terminal 4. The flight support processing represents a series of processing that is executed in flight of the main drone 2 until the plurality of sub-drones 1 previously move to respective positions (respective predicted positions) capable of being set to a route of the main drone 2 to acquire environmental information such as a wind direction and a wind speed, and the sub-drone control terminal 3 determines a movement route along which the main drone 2 can safely fly on the basis of pieces of environmental information of the positions which are acquired by the plurality of sub-drones 1.

Figure 9:
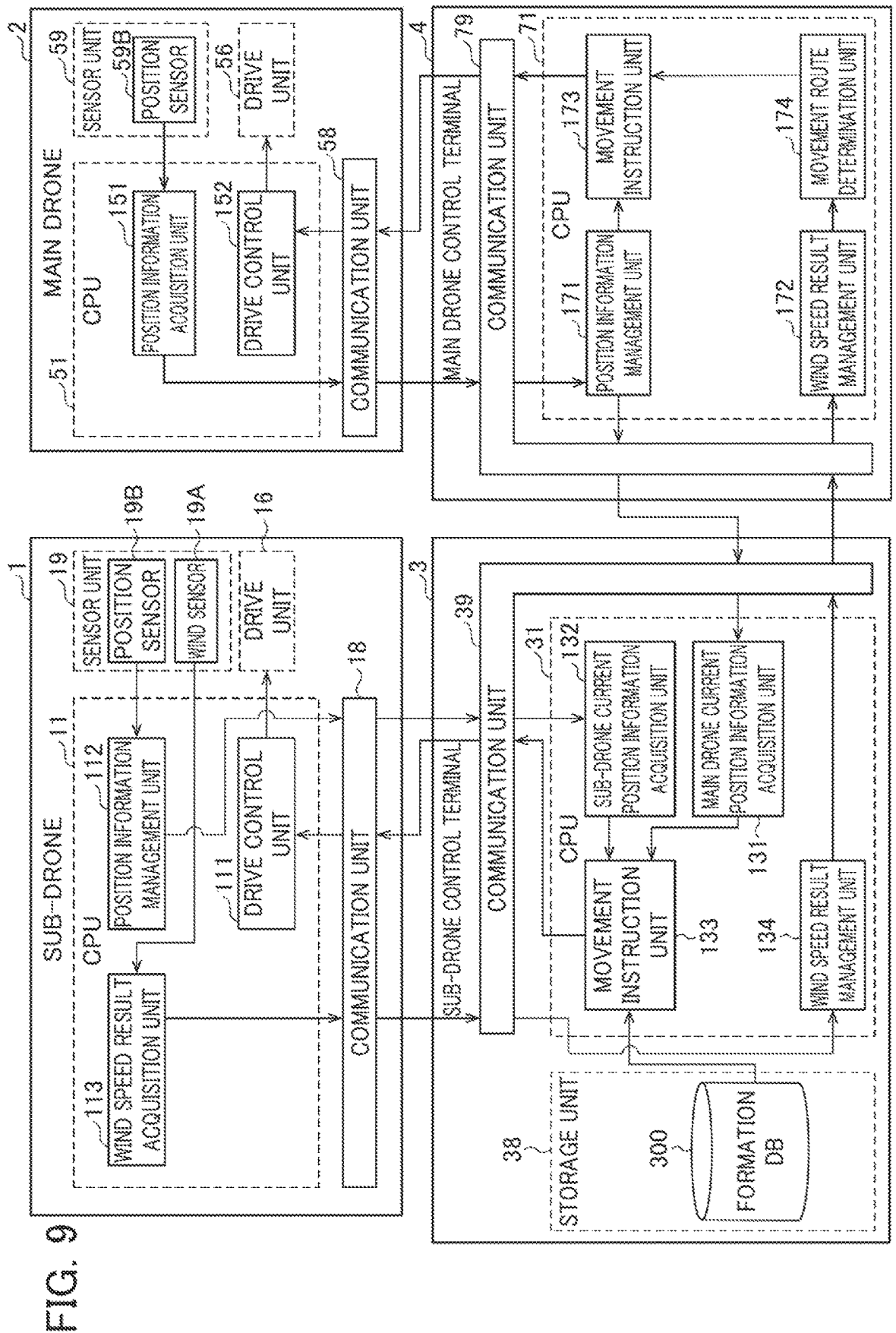
FIG. 9 is a functional block diagram illustrating an example of a functional configuration of the sub-drone, the sub-drone control terminal, a main drone, and a main drone control terminal in the flight system illustrated in FIG. 2, and illustrating an example different from the example illustrated in FIG. 5.

FIG. 9 is a functional block diagram illustrating an example of a functional configuration capable of realizing the flight support processing in the functional configurations of the flight system illustrated in FIG. 2. Hereinafter, an example of a functional configuration of each of the sub-drone 1, the sub-drone control terminal 3, the main drone control terminal 4, and the main drone 2 will be individually described in this order.

As illustrated in FIG. 9, in a CPU 11 of the sub-drone 1, a drive control unit 111, a position information management unit 112, and a wind speed result acquisition unit 113 function. Respective functional blocks of the sub-drone 1 are similar to the functional blocks in the first embodiment illustrated in FIG. 5. That is, the functional configuration of the sub-drone 1 of the second embodiment is similar to the functional configuration in the first embodiment.

In a CPU 31 of the sub-drone control terminal 3, a main drone current position information acquisition unit 131, a sub-drone current position information acquisition unit 132, movement instruction unit 133, and a wind speed result management unit 134 function. A formation DB 300 is provided in one region of the storage unit 38. Respective functional blocks of the sub-drone control terminal 3 are similar to the functional blocks in the first embodiment illustrated in FIG. 5. That is, the functional configuration of the sub-drone control terminal 3 of the second embodiment is similar to the functional configuration in the first embodiment. However, the movement instruction unit 133 determines respective positions (respective predicted positions) capable of being set to the route of the main drone 2 as movement positions of the plurality of sub-drones 1 on the basis of a current position or a predicted position of the main drone 2. In addition, the movement instruction unit 133 generates a movement instruction on the basis of a difference between a current position and a movement position for every each of the plurality of sub-drones 1, and transmits the movement instruction through a communication unit 39. According to this, each of the plurality of sub-drones 1 previously moves to respective positions (respective predicted positions) capable of being set to a route of the main drone 2 to acquire each piece of environmental information, and transmits the environmental information to the sub-drone control terminal 3. Here, the wind speed result management unit 134 acquires the environmental information from each of the plurality of sub-drones 1 through the communication unit 39. The wind speed result management unit 134 transmits the environmental information from each of the plurality of sub-drones 1 to the main drone control terminal 4 through the communication unit 39.

In a CPU 71 of the main drone control terminal 4, a position information management unit 171, a wind speed result management unit 172, a movement instruction unit 173, and a movement route determination unit 174 function. The position information management unit 171 to the movement instruction unit 173 among the respective functional blocks of the main drone control terminal 4 are similar to the functional blocks in the first embodiment illustrated in FIG. 5. However, the movement route determination unit 174 that does not exist in the first embodiment functions in the main drone control terminal 4 of the second embodiment. In addition, unlike the first embodiment, the movement instruction unit 173 of the second embodiment generates a movement instruction on the basis of an output of the movement route determination unit 174, and transmits the movement instruction to the main drone 2 through a communication unit 79.

Specifically, for example, the wind speed result management unit 172 acquires each piece of environmental information (environmental information acquired by each of the plurality of sub-drones 1) of each of the positions (the predicted positions) capable of being set to the route of the main drone 2 from the sub-drone control terminal 3 through the communication unit 79, and provides the environmental information to the movement route determination unit 174. The movement route determination unit 174 determines the movement route of the main drone 2 on the basis of the environmental information (environmental information acquired by each of the plurality of sub-drones 1) of each of the positions (respective predicted positions) capable of being set to the route of the main drone 2. Specifically, for example, even in the case of desiring to move to a predetermined destination, typically, the main drone 2 can head toward the destination by selecting an arbitrary movement route from various movement routes. Here, with respect to each candidate of the plurality of movement routes which the main drone 2 can select, each of the plurality of sub-drones 1 previously moves along the movement route, and acquires the environmental information. The movement route determination unit 174 recognizes safety of each candidate of the plurality of movement routes on the basis of the environmental information. For example, the movement route determination unit 174 recognizes a candidate in which a wind speed is strong as a dangerous candidate, and recognizes a candidate in which the wind speed is weak as a safe candidate. In addition, the movement route determination unit 174 appropriately combines one or more candidates recognized to be safe and determines a movement route before a destination of the main drone 2. In other words, the movement route determination unit 174 can determine a safe movement route with less influence of wind as the movement route of the main drone 2 on the basis of the environmental information acquired from each of the sub-drones 1 arranged at each of a plurality of movement routes (candidates) which can be selected by the main drone 2.

Note that, as a determination method of the movement route of the main drone 2, it is possible to employ a method of setting the safest movement route among the plurality of movement routes (candidates) as the movement route of the main drone 2. However, the method is illustrative only For example, it is possible to employ a method in which a threshold value is set in advance with respect to an element (for example, a wind speed or the like) of the environmental information, a movement route (candidate) for which environmental information exceeding the threshold value is acquired is determined as an unsafe route, a movement route (candidate) for which environmental information that does not exceed the threshold value is acquired is determined to be safe, and the movement route of the main drone 2 is determined on the basis of the determination results.

In a CPU 51 of the main drone 2, a position information acquisition unit 151 and a drove control unit 152 function. Respective functional blocks of the main drone 2 are similar to the functional blocks in the first embodiment illustrated in FIG. 5. That is, the functional configuration of the main drone 2 of the second embodiment is similar to the functional configuration in the first embodiment.

Figure 10:
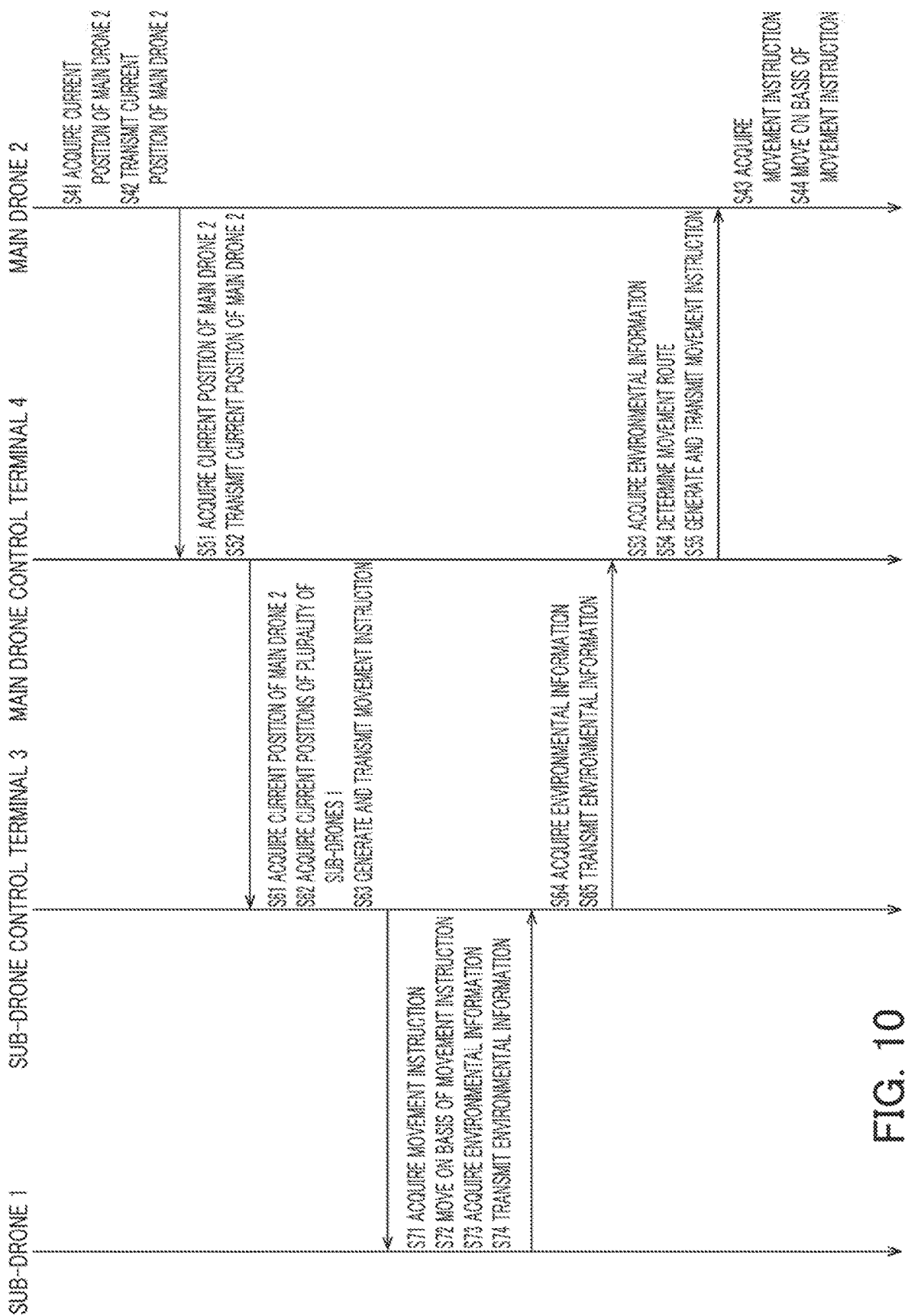
FIG. 10 is a sequence diagram illustrating a flow of flight support processing executed in the flight system having the functional configuration illustrated in FIG. 9.

FIG. 10 is a sequence diagram illustrating a flow of flight support processing executed in the flight system having the functional configuration illustrated in FIG. 9.

In step S41, the position information acquisition unit 151 of the main drone 2 acquires a current position of the main drone 2. In step 342, the position information acquisition unit 151 of the main drone 2 transmits the current position of the main drone 2 to the main drone control terminal 4.

In step S51, the position information management unit 171 of the main drone control terminal 4 acquires the current position of the main drone 2 which is transmitted in step 342 through the communication unit 79. In step 352, the position information management unit 171 of the main drone control terminal 4 transmits current position information of the main drone 2 to the sub-drone control terminal 3.

In step S61, the main drone current position information acquisition unit 131 of the sub-drone control terminal 3 acquires the current position of the main drone 2 which is transmitted in step S52. In step S62, the sub-drone current position information acquisition unit 132 of the sub-drone control terminal 3 acquires a current position of each of the plurality of sub-drones 1. In step S63, the movement instruction unit 133 of the sub-drone control terminal 3 generates a movement instruction of each of the plurality of sub-drones 1 on the basis of the current position of the main drone 2 which is acquired in step S61, and the current position of each of the plurality of sub-drones 1 which is acquired in step S62, and transmits the movement instruction to each of the plurality of sub-drones 1.

In step S71, the drive control unit 111 of each of the plurality of sub-drones 1 acquires the movement instruction information transmitted in step S63. In step S72, the drive control unit 111 of each of the plurality of sub-drones 1 controls the drive unit 16 in accordance with the movement instruction acquire in step S71. According to this, each of the plurality of sub-drones 1 moves to a position of each candidate of the movement route of the main drone 2. In step S73, the wind speed result acquisition unit 113 of each of the plurality of sub-drones 1 acquires a wind direction or a wind speed of the position of the candidate of the movement route of the main drone 2 as each piece of environmental information. In step S74, the wind speed result acquisition unit 113 of each of the plurality of sub-drones 1 transmits the environmental information of the position of the candidate of the movement route of the main drone 2 to the sub-drone control terminal 3.

In step S64, the wind speed result management unit 134 of the sub-drone control terminal 3 acquires the environmental information of each of the plurality of sub-drones 1. In step S65, the wind speed result management unit 134 of the sub-drone control terminal 3 transmits the environmental information transmitted from each of the plurality of sub-drones 1 to the main drone control terminal 4.

In step S53, the wind speed result management unit 172 of the main drone control terminal 4 acquires the environmental information from each of the plurality of sub-drones 1, that is, the environmental information of the position of the candidate of the movement route of the main drone 2 from the sub-drone control terminal 3. In step S54, the movement route determination unit 174 of the main drone control terminal 4 determines the movement route of the main drone 2 on the basis of a plurality of pieces of the environmental information acquired in step S53. In step S55, the movement instruction unit 173 of the main drone control terminal 4 generates a movement instruction for the main drone 2 on the basis of the movement route determined in step S54 and a current position of the main drone 2, and transmits the movement instruction to the main drone 2. Note that, the current position of the main drone 2 may be acquired at timing in step S52, or may be acquired at the subsequent timing (not illustrated in FIG. 6).

In step S43, the drive control unit 152 of the main drone 2 acquires the movement instruction of the main drone 2. In step S44, the drive control unit 152 of the main drone 2 causes the drive unit 56, in accordance with the movement instruction of the main drone 2, to move the main drone 2.

When the flight support processing in FIG. 10 is repeatedly executed, the main drone 2 can fly along a safe movement route that is less susceptible to an influence of an environment.

Figure 11:
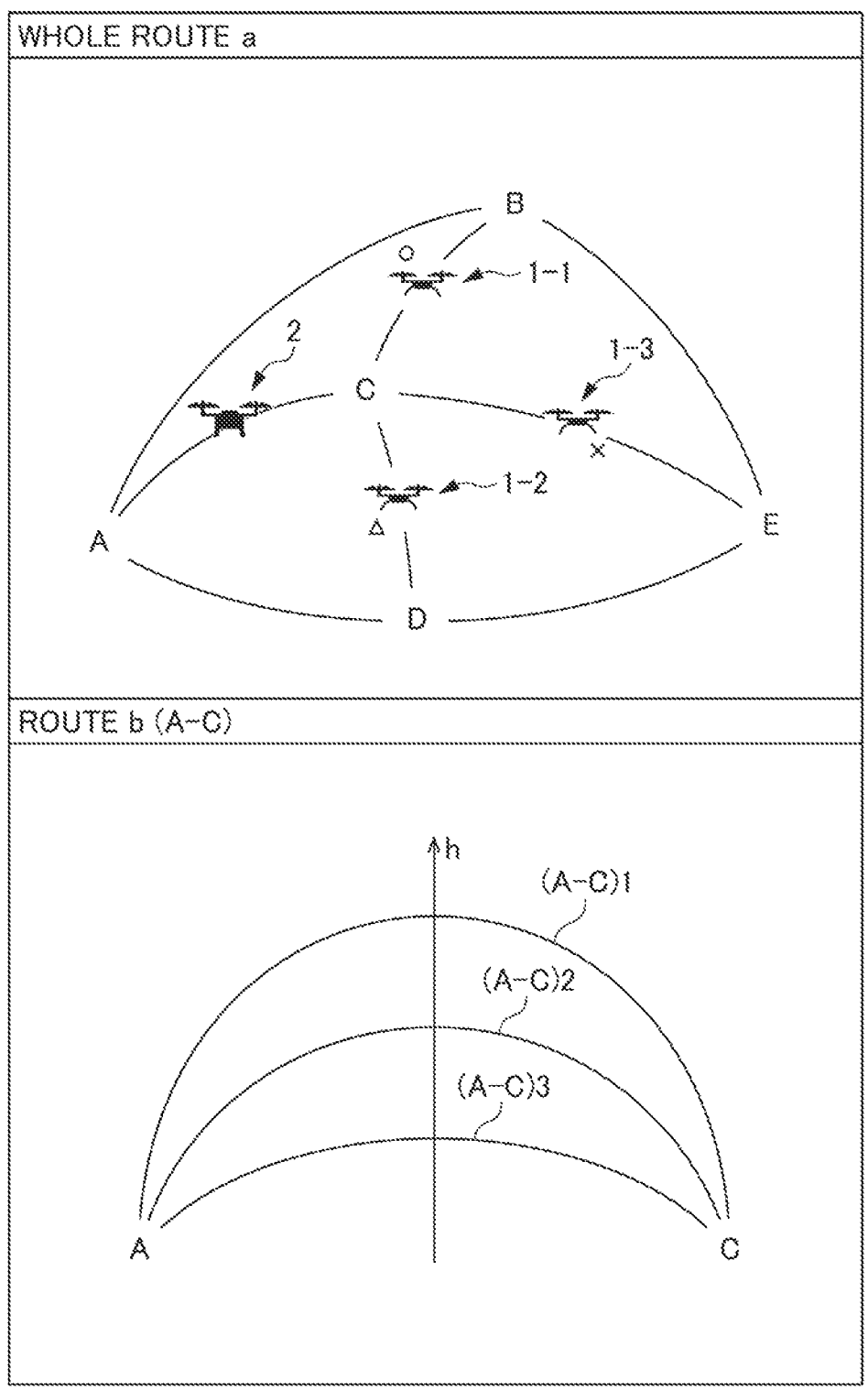
FIG. 11 is a diagram illustrating an example of a method of determining a movement route of the main drone.

FIG. 11 is a diagram illustrating an example of a method of determining the movement route of the main drone 2. A drawing on an upper side in FIG. 11 (drawing described as Whole Route a) illustrates an example of the candidate of the movement route of the main drone 2. In the same drawing, a position A to a position E represent bases of the movement route. Hereinafter, a candidate of the movement route between two adjacent bases is referred to as "route section". Hereinafter, a route section from a position α (α represents any one of A to E) to a position β (β represents any one of A to F except for α) adjacent to the position α is described as "route section α-β".

In the drawing on the upper side in FIG. 11, a starting point of the movement route of the main drone 2 is set to the position A, and an end point thereof is set to the position E. For example, while the main drone 2 is flying in the route section α-β, a plurality of route sections in which position β is set as a starting point may exist. For example, as illustrated in the drawing on the upper side of FIG. 11, in a case where the main drone 2 is flying in a route section A-C, three route sections C-B, C-D, and C-E in which the position C is set as the starting point exist.

In this case, the sub-drone control terminal 3 sets the three route sections C-B, C-D, and C-E as the candidate of the movement route, and arranges the three sub-drones 1-1, 1-2, and 1-3 in the three route sections C-B, C-D, and C-E. The three sub-drones 1-1, 1-2, and 1-3 respectively acquire environmental information in the three route sections C-B, C-D, and C-E, and transmit the environmental information to the main drone control terminal 4 through the sub-drone control terminal 3.

Here, the three sub-drones 1-1, 1-2, and 1-3 may fly in a formation with the main drone 2 or may be respectively provided in advance in the vicinity of the three route sections C-B, C-D, and C-E. In addition, each of the three sub-drones 1-1, 1-2, and 1-3 may acquire environmental information of one point such as the vicinity of the center of each of the three route sections C-B, C-D, and C-E, or may acquire environmental information of a plurality of points while flying in the three route sections C-B, C-D, and C-E.

The main drone control terminal 4 determines the degree of safety of each of the three route sections C-B, C-D, and C-E, the like on the basis of the environmental information of each of the three route sections C-B, C-D, and C-E. The main drone control terminal 4 determines one route section as the subsequent movement route of the main drone 2 on the basis of the determination result. In the example on the upper side in FIG. 11, the route section C-B has the highest safety (circle in the same drawing), the route section C-D has the second highest safety (triangle in the same drawing), and the route section C-E has the lowest safety (x in the same drawing). In this case, for example, the main drone control terminal 4 may set only the safety as a determination element, and may determine the route section C-B having the highest safety as the subsequent movement route of the main drone 2. Alternatively, for example, the main drone control terminal 4 may primarily select a route section having safety equal to or greater than a constant threshold value, for example, the route section C-B or C-D as a final candidate, and may determine the route section as the movement route of the main drone 2 in consideration of another determination element (for example, a close distance or the like).

Here, an end point of a route section that becomes a candidate of the movement route of the main drone 2 may be closed due to a certain reason. In this case, a route section passing through the closed end point may be excluded in acquisition of the environmental information, and the sub-drone 1 may not be arranged in the route section. For example, although not illustrated, in a case where the position C is closed, the sub-drone 1-2 may not be arranged in the route section C-D.

In addition, for example, with respect to a route section for which confirmation of safety is already known, it is not necessary to obtain the environmental information again, and thus the route section may be excluded in acquisition of the environmental information, and the sub-drone 1 may not be arranged in the route section. Here, as the route section for which confirmation of safety is already known, for example, a route section through which another main drone 2 already passed for a predetermined period (for example, a period from five minutes ago to the present, or the like) and thus safety has been confirmed may be assumed. In addition, for example, a route section for which another sub-drone 1 (may be a sub-drone that supports the main drone 2 or may be a sub-drone that supports another main drone 2) has already acquired the environmental information can be assumed as the route section for which confirmation of safety is already known. In addition, for example, a route section in which the environmental information is acquired by observing a fixed point with a fixedly disposed measurement device or the like can be assumed as the route section for which confirmation of safety already known.

Note that, a determination method of the movement route by confirmation as to whether or not it is safe is not particularly limited to the above-described method. For example, as described above, the wind direction or the wind speed may often vary in correspondence with a height even at the same position. Here, as illustrated in a drawing (drawing described as Route b (A-C)) on a lower side in FIG. 11, it is possible to employ a method in which classification is made into a first route section (A-C) 1, a second route section (A-C) 2, and a third route section (A-C) 3 in which a starting point and an end point are the same in each case, but which are different, in a height, and environmental information of each of the route sections is acquired. According to this, even when the starting point and the end point are the same in each case, it is possible to assume candidates of a plurality of movement routes in consideration of the height, and thus it is possible to determine more optimal movement route.

In addition, for example, although not illustrated, it is possible to employ a method in which an arbitrary sub-drone 1 is caused to previously move to obtain environmental information, and another sub-drone 1 is caused to further move on the basis of the content of the environmental information or the like to acquire environmental information. Specifically, for example, in a case where an arbitrary one sub-drone 1 previously moves, circulates, and turbulence or the like occurs (a case where environmental information capable of specifying the turbulence can be acquired), another sub-drone 1 may retrieve a movement route capable of avoiding the turbulence. That is, in this example, as an example of a state of the main drone 2, an environment of respective positions (respective predicted positions) capable of being set to the movement route of the main drone 2 is employed.

In addition, for example, each of a plurality of the sub-drones 1 can acquire environmental information at each position in real time. Here, in a case where the main drone 2 flies in a formation with the plurality of sub-drones 1, it is possible to employ a method in which the movement route of the main drone 2 is caused to vary every moment in real time on the basis of the environmental information acquired by each of the plurality of sub-drones 1 in real time. According to this, for example, while the main drone 2 is moving along an arbitrary movement route, in a case where another movement route is confirmed to be safe, it is possible to make a change to the other movement route in real time.

In addition, for example, the sub-drone 1 may acquire the environmental information in a route section that is set in advance as illustrated in FIG. 11, but the sub-drone 1 may acquire the environmental information after freely moving within a constant range. Even in this case or the like, it may be difficult for the sub-drone 1 to acquire radio waves from a GPS satellite due to a relationship of terrain or the like. In this case, so as to acquire radio waves form the GPS satellite, it is preferable that the sub-drone 1 takes a posture capable of reliably understanding own position by increasing the intensity of the radio waves. According to this, even when the sub-drone 1 has freely moved, it is possible to accurately specify an acquisition position of the environmental information.

That is, in this example, as a state of the main drone 2 that is a mobile object, a state in which a current position and a candidate of the movement route of the main drone 2 exist is employed. Specifically, for example, in the example illustrated in FIG. 11, as a candidate for a route section through which the main drone 2 passes in the future, that is, which is a movement route through which the main drone 2 can pass, a plurality of route sections (for example, the three route sections C-B, C-D, and C-E) starting from the position are set. Accordingly, the main drone 2 can also determine the movement route of the main drone 2 on the basis of the candidate of the route section through which the main drone 2 can pass in the future in addition to current position β information. That is, for example, it is possible to consider determination of the movement route of the main drone 2 by employing not only information of the current position and but also the candidate of the route section through which the main drone 2 can pass in the future as a state of the main drone 2.

Hereinbefore, description has been given of embodiments of the invention, but the invention is not limited to the embodiments, and it should be understood that modification, improvements, and the like are included in the invention in a range capable of accomplishing the object of the invention. In addition, the effects described in the embodiments merely enumerate the most preferable effects resulting from the invention, and the effects according to the invention are not limited to the effects described in the embodiments.

For example, in the first embodiment and the second embodiment, description has been given of an example in which the sub-drone 1 and the sub-drone control terminal 3 communicate with each other, and the main drone 2 and the main drone control terminal 4 communicate with each other, but there is no particular limitation to this example. That is, there is no limitation to the example in which the sub-drone 1 and the sub-drone control terminal 3 communicate with each other, and the main drone 2 and the main drone control terminal 4 communicate with each other. Specifically, for example, the sub-drone 1 transmits the environmental information or the current position which is detected by the wind sensor 19A or the position sensor 19B to the sub-drone control terminal 3, but there is no particular limitation to this configuration. That is, the above-described information or the like can be directly transferred between the sub-drone 1 and the main drone 2. In addition, similarly, the current position detected by the position sensor 59B of the main drone 2 may be directly transferred between the main drone 2 and the sub-drone 1.

In addition, for example, it is not particularly necessary to cause one sub-drone control terminal 3 to collectively execute the flight control of a plurality of the sub-drones 1. That is, the number of the sub-drones 1 and the number of the sub-drone control terminals 3 are not necessary to match each other, and may be an arbitrary number. This is also true of a relationship between the main drone 2 and the main drone control terminal 4. In addition, it is not particularly necessary to classify terminals which perform flight control between the sub-drone 1 and the main drone 2, and although not illustrated, one centralized control device or the like may perform flight control of the sub-drone 1 and the main drone 2.

In addition, in the first embodiment and the second embodiment, the sub-drone 1 moves to a position at which a current position or a predicted position of the main drone 2 is set as a reference. Here, in a case where the movement route of the main drone 2 is determined in advance, the sub-drone 1 can also move along the movement route. The movement is an example of movement to a position at which the predicted position (each position on the movement route) of the main drone 2 is set as a reference. In addition, the sub-drone 1 is not limited to the movement in which the current position or the predicted position of the main drone 2 is set as a reference, and control of movement based on a state of the main drone 2 is sufficient, and the sub-drone 1 can perform arbitrary movement on the basis of the control. That is, control of movement of the sub-drone 1 is not based on only the current position or the predicted position of the main drone 2. For example, in a case where the sub-drone control terminal 3 or the like gives an instruction for the sub-drone 1 to move to a certain position (for example, a position above a location where the main drone 2 is located before the main drone 2 takes off), the sub-drone 1 may move to the certain position. Specifically, for example, in a state before the main drone 2 takes off (for example, a standby state before the main drone 2 takes off), the sub-drone 1 receives the instruction and can move in accordance with the instruction regardless of the current position or the predicted position of the main drone 2. This is also true of a situation in which the main drone 2 lands on the ground G. As described above, the sub-drone 1 can perform not only the movement in which the current position or the predicted position of the main drone 2 is set as a reference but also movement in accordance with an arbitrary instruction for moving the sub-drone 1.

In addition, in the first embodiment and the second embodiment, description has been given of the sub-drone 1 as a mobile object, but there is no particular limitation to the sub-drone 1. That is, as the mobile object, a device other than the sub-drone 1 may be used. Specifically, for example, as a substitute for the sub-drone 1, a balloon which includes the sensor unit 19 such as the wind sensor 19A and of which movement can be controlled may be used. For example, a balloon including various functions included in the sub-drone 1 is provided near a position where the main drone 2 takes off or lands. Here, it should be noted that the balloon can freely move to an arbitrary height in a state of being fixed by a winch or the like provided with a motor. According to this, the balloon can acquire environmental information in correspondence with an environment (a wind force or a wind direction) that varies every moment. Note that, a variable control method of the height of the balloon is not particularly limited. For example, it is possible to employ a method in which a user manually adjusts the height to an arbitrary position, it is possible to use a method in which the balloon is automatically moved in the vertical direction at a constant speed, or it is possible to use a method in which the balloon is automatically moved to a position where wind (a wind direction or a wind speed) is strong.

In addition, in the first embodiment and the second embodiment, description has been given of an example in which information acquired by the sub-drone 1 and the main drone 2 is the environmental information, the current position of the sub-drone 1, and the current position of the main drone 2, but there is no particular limitation to this example. That is, the sub-drone 1 or the main drone 2 can acquire information other than the above-described information. Specifically, for example, the main drone 2 can acquire prediction information other than the above-described information. Here, the prediction information will be described. The prediction information is information relating to respective position (respective predicted positions) capable of being a route of the main drone 2. For example, the main drone 2 acquires information relating to acceleration of the main drone 2 from an acceleration sensor that is not illustrated in the sensor unit 59. In addition, the main drone 2 estimates, for example, positions (predicted positions) after five seconds and ten seconds from the information relating to the acceleration. The main drone 2 provides the information including the predicted positions to the sub-drone control terminal 3 as prediction information. According to this, the sub-drone control terminal 3 can determine a movement position of the main drone 2 on the basis of the predicted positions of the main drone 2.

In addition, in the first embodiment and the second embodiment, description has been given of an example in which the sub-drone 1 moves on the basis of the movement instruction from the sub-drone control terminal 3, but there is no limitation to this example. That is, the sub-drone 1 can move to an arbitrary position in accordance with an arbitrary method other than the movement instruction. Specifically, for example, it is possible to employ a method in which among a plurality of the sub-drones 1, one is set as a master and the others are set as slaves, flight control based on the movement instruction is set to only the master, and the slaves move in conjunction with the master. Specifically, for example, the master moves in accordance with the movement instruction, but the slaves may automatically move to be located near the master. In addition, for example, the slaves may automatically move to a position where a wind direction or a wind speed is strong. In addition, for example, the slaves may move in consideration of a position (predicted position) of the master or the main drone 2 after seconds. In addition, the sub-drone 1 may move on the basis of information relating to taking-off or landing of the main drone 2.

In addition, in the first embodiment and the second embodiment, description has been given of an example in which a plurality of the sub-drones 1 exist, but there is no limitation to the example. That is, the number of the sub-drones 1 can be determined in an arbitrary manner or in an automatic manner. Specifically, for example, the sub-drone 1-1 is caused to previously move within a constant range to investigate a range for which an influence of wind or the like is strong, and the number of the sub-drones 1 for acquiring environmental information can be determined from a result of the investigation. According to this, in a case where an influence of an environment is less, the number of the sub-drones 1 may be decreased, and in a case where the influence of the environment is much, the number of the sub-drones 1 may be increased, and thus it is possible to flexibly cope with a variation of the environment that varies every moment in real time.

In addition, in the first embodiment and the second embodiment, description has been given of an example in which the sensor unit 19 provided in the sub-drone 1 and the main drone 2 is constituted by the wind sensor 19A, the position sensor 19B, and the like, but there is no limitation to the example. That is, with regard to the sensor unit 19 or the like, a sensor for acquiring different information other than the wind sensor 19A, the position sensor 19B, and the like may be provided. Specifically, for example, the sensor unit 19 and the like may be provided with an infrared sensor other than the above-described sensors. When the infrared sensor is provided, it is possible to detect a distance from an object (for example, the ground G, an obstacle, or the like) by using infrared rays. In addition, in the case of a combination with another sub-drone 1, a distance from each sub-drone 1 may be detected to prevent collision. In addition, the sensor unit 19 and the like may be further provided with an image sensor, a Gyro sensor, a photo sensor, or the like as the other sensors.

In addition, with regard to detection of the distance from the object (for example, the ground G, the obstacle, or the like), detection of the distance can be performed by using a color camera or the like without limitation to the infrared sensor. Specifically, for example, the distance between the object, and the sub-drone 1 and the main drone 2 can be detected by stereo vision using one or more color cameras (for example, a binocular camera) or stereo cameras. That is, in a case where parallax is sufficiently obtained from the one or more color cameras or stereo cameras provided in at least one of the sub-drone 1 or the main drone 2, it is possible to calculate a position, a distance, or the like of the object on the basis of triangulation from a captured image. According to this, it is possible to accurately detect the distance between the object, and the sub-drone 1 and the main drone 2, and thus it is also possible to prevent collision. In addition, in the embodiments, even in a case where the sub-drone 1 and the main drone 2 are not stopped, that is, are moving, it is possible to use another method such as simultaneous localization and mapping (SLAM) with one or more color cameras. According to this, the sub-drone 1 and the main drone 2 can accurately detect the distance between the object (for example, the ground G, the obstacle, or the like), and the sub-drone 1 and the main drone 2, and thus it is possible to prevent collision.

In addition, for example, in the first embodiment, in FIG. 8, description has been given of an example in which one sub-drone 1 to four sub-drones 1 are arranged, but there is no particular limitation to the example. That is, four or more sub-drones 1 may be arranged, or an arrangement pattern (formation) is not limited to FIG. 8 or the like. Specifically, for example, it is possible to employ three-dimensional arrangement in which four or more sub-drones 1 exist. That is, in a case where five sub-drones 1 exist, the sub-drones 1 may be arranged so as to form a quadrangular pyramid with the main drone 2 set as the center.

In addition, for example, in the second embodiment, description has been given of an example in which with regard to determination of a candidate of the movement route of the main drone 2, the determination is made on the basis of the environmental information, but there is no particular limitation to the example. That is, the movement route determination unit 174 of the main drone control terminal 4 can make a determination also in consideration of information other than the environmental information. Specifically, for example, with regard to determination of the candidate of the movement route of the main drone 2, in the case of desiring to consider information relating to the weather, the main drone control terminal 4 acquires an automated meteorological data acquisition system (AMEDAS) map or map information relating to the weather from WEB or the like through the network N. In addition, the movement route determination unit 174 of the main drone control terminal 4 can determine the movement route of the main drone 2 on the basis of the information. According to this, the movement route determination unit 174 of the main drone control terminal 4 can determine a candidate of an optimal movement route of the main drone 2 in consideration of information relating to the weather such as rain and snow other than the wind speed or the wind direction.

In addition, for example, the series of processing can be executed by hardware or can be executed by software. In other words, the functional configurations in FIG. 5 and FIG. 9 are illustrative only, and are not particularly limited. That is, it is sufficient that the flight system is provided with the function capable of executing the series of processing as a whole, and what kind of functional blocks are used to realize the function is not particularly limited to the example illustrated in FIG. 5 and FIG. 9. In addition, the location of the functional block is not particularly limited to FIG. 5 and FIG. 9, and may be arbitrary. For example, the functional block of the sub-drone 1 may be transferred to the sub-drone control terminal 3 or the like. In contrast, the functional block of the sub-drone control terminal 3 may be transferred to the sub-drone 1 or the like. Similarly, the functional block of the main drone 2 may be transferred to the main drone control terminal 4 or the like. In contrast, the functional block of the main drone control terminal 4 may be transferred to the main drone 2 or the like. Specifically, for example, flight control such as generation of the movement instruction may be executed by the main drone 2 or the sub-drone 1 without using the sub-drone control terminal 3 or the main drone control terminal 4. More specifically, the movement instruction unit 133 functions in the CPU 31 of the sub-drone control terminal 3 in the above-described embodiments, but may function, for example, in the CPU 11 of the sub-drone 1. In addition, similarly, the main drone current position information acquisition unit 131, the sub-drone current position information acquisition unit 132, and the wind speed result management unit 134 may function, for example, in the CPU 11 of the sub-drone 1. In addition, the position information management unit 171, the wind speed result management unit 172, and the movement instruction unit 173 function in the CPU 71 of the main drone control terminal 4, but may function, for example, in the CPU 51 of the main drone 2. In addition, one functional block may be constituted by a hardware element, a software element, or in combination of the elements.

In addition, for example, in a case where the series of processing is executed by software, a program that constitutes the software is installed in a computer or the like from a network or a recording medium. The computer may be a computer provided in dedicated hardware. In addition, the computer may be a computer that can execute various functions by installing various program, for example, a general-purpose smartphone or personal computer in addition to a server.

In addition, for example, the recording medium including the program is constituted by not only a removable medium (not illustrated) that is distributed separately from a device main body so as to provide a user with the program, but also a recording medium that is provided to the user in a state of being provided in the device main body.

Note that, in this specification, steps of describing the program recorded in the recording medium include not only processing that is time-serially performed according to the order of the steps, but also processing that is executed in parallel or individually in the case of not being time-serially processed. In addition, in this specification, it is assumed that a term of the system represents a whole device constituted by a plurality of devices or a plurality of units.

In other words, the information processing system to which the invention is applied includes the above-described various flight systems, and can employ various embodiment aspects having the following configurations. That is, the information processing system to which the invention is applied is an information processing system (for example, the flight system) including a flying object (for example, the main drone 2 in FIG. 1), a control device (for example, the main drone control terminal 4 in FIG. 5 and FIG. 9) that executes flight control of the flying object, and a mobile object (for example, the sub-drone 1 in FIG. 1, or a balloon of which movement control is possible) that supports flight of the flying object, the information processing system including: a movement control unit (for example, the movement instruction unit 133 in FIG. 5 and FIG. 9) that executes movement control of the mobile object on the basis of a state of the flying object; an acquisition unit (for example, the wind sensor 19A in FIG. 5 and FIG. 9) that acquires measurement information relating to an ambient environment of the mobile object; and a transmission control unit (for example, the wind speed result management unit 134 in FIG. 5 and FIG. 9) that executes control of transmitting the measurement information or processed information of the measurement information to the control device or the flying object. According to this, in the main drone 2, with respect to an environment that varies every moment in real time, it is possible to appropriately reduce an influence of the environment.

In addition, the movement control unit may execute the movement control of the mobile object on the basis of a state of a current position or a predicted position of the flying object as the state of the flying object. According to this, the movement instruction unit 133 can move the sub-drone 1 on the basis of the current position or the predicted position of the main drone 2.

In addition, the control device may execute flight control of the flying object on the basis of the measurement information or the processed information. According to this, the main drone control terminal 4 can move the main drone 2 on the basis of the environmental information or the like.

In addition, the measurement information may be information relating to wind at a position of the mobile object of which movement is controlled by the movement control unit. According to this, since the main drone control terminal 4 acquires the environmental information, and thus the main drone control terminal 4 easily supports the taking-off or landing of the main drone 2 in consideration of an influence of wind.

In addition, the movement control unit may execute the movement control to move the mobile object to a position spaced apart from a taking-off or landing position of the flying object by a first distance in a horizontal direction, and by a second distance in a vertical direction. According to this, in the main drone 2 that takes off or lands, with respect to an environment that varies every moment, in real time, it is possible to appropriately reduce an influence of the environment (it is possible to stably take off or land an airframe).

In addition, the movement control unit may execute the movement control to move the mobile object to a first position and a second position which are different in the second distance in the vertical direction, the acquisition unit may acquire first measurement information relating to an environment at the first position, and second measurement information relating to an environment at the second position, and the transmission control unit may execute control of transmitting the first measurement information and the second measurement information or processed information of the first measurement information and processed information of the second measurement information to the control device or the flying object. According to this, since wind is different depending on a height, when using a wind speed or a wind direction of each of a plurality of height positions, in the main drone 2 that takes off or lands, it is possible to more appropriately reduce an influence of the environment.

In addition, the movement control unit may execute the movement control to move the mobile object in a state in which a position of the mobile object relative to a current position of the flying object is set to be constant. According to this, the sub-drone 1 can fly in a state in which a relative position with a main body is set to be constant. The sub-drone 1 can measure an environment that varies every moment in real time under the same condition with accuracy. Accordingly, in the main body drone, it is possible to more appropriately reduce an influence of the environment.

In addition, the movement control unit may execute the movement control to move the mobile object to be located on a windward side with respect to the flying object. According to this, the sub-drone 1 flies on the windward side with respect to the main drone 2. Accordingly, the sub-drone 1 can effectively measure an environment that varies every moment in real time with accuracy. Accordingly, in the main drone 2, it is possible to more appropriately reduce the influence of the environment.

In addition, the mobile object may be capable of moving as a movement group in combination with one or more other mobile objects, and a position of each of a plurality of the mobile objects included in the movement group may be determined on the basis of the measurement information relating to an ambient environment of at least one of the mobile objects. According to this, it is possible to appropriately determine a position of the sub-drone 1 in correspondence with a situation of wind. In addition, in a case where a plurality of drones are used rather than one drone, it is possible to obtain measurement information relating to an environment in a more ranges instead of one point near the main drone 2. Accordingly, in the main drone 2, it is possible to more appropriately reduce the influence of the environment.

In addition, a position of each of the plurality of mobile objects included in the movement group may be determined in consideration of a distribution in a horizontal direction and a distribution in a vertical direction. According to this, positions of the sub-drones 1 are determined in consideration of not only a two-dimensional plane but also a height, that is, an efficient three-dimensional arrangement of the sub-drones 1 becomes possible.

In addition, on the basis of the measurement information relating to the ambient environment of at least one of the one or more mobile objects which are moved as the movement group, a total number of the mobile objects moving as the movement group may vary. According to this, the number of the sub-drones 1 in a combination may be increased or decreased in correspondence with a situation of wind in flight, and thus it is possible to set an appropriate combination. Specifically, for example, the sub-drones 1 may be caused to previously fly to observe a situation of wind, and it is possible to set a combination of the sub-drones 1 on the basis of the observation result.

In addition, at least one of the mobile objects in the movement group may be moved with respect to a section for which safety is not confirmed among a plurality of route sections in which the flying object is capable of flying, and safety or non-safety may be confirmed on the basis of the measurement information relating to an ambient environment of at least one of the mobile objects. According to this, only a safe section selected among respective route sections is selected, and the flight route of the main drone 2 is determined. Accordingly, safety of the main drone 2 is secured, and flight not susceptible to an influence of wind is possible.

In addition, a section for which safety is confirmed may include a route section to which another flying object or another mobile object flies or moves within a predetermined period. According to this, a section in which another main drone 2 or another sub-drone 1 flies for a predetermined period (for example, five minutes ago), the section is regarded as a safe section, and thus it is possible to reduce the number of times of flying the sub-drone 1 for safety confirmation. As a result, it is possible to perform efficient safety confirmation by the sub-drone 1.

EXPLANATION OF REFERENCE NUMERALS

1: sub-drone, 2: main drone, 3: sub-drone control terminal, 4: main drone control terminal, 11: CPU, 16: drive unit, 19: sensor unit, 19A: wind sensor, 19B: position sensor, 111: drive control unit, 112: position information management unit, 113: wind speed result acquisition unit, 131: main drone current position information acquisition unit, 132: sob-drone current position information acquisition unit, 133: movement instruction unit, 134: wind speed result management unit, 151: position information acquisition unit, 152: drive control unit, 171: position information management unit, 172: wind speed result management unit, 173: movement instruction unit, 174: movement route determination unit, 300: formation DB

The invention claimed is:
1. An information processing system including a flying object, a control device that executes flight control of the flying object, a first mobile object that supports flight of the flying object, a network, and a control terminal for mobile objects comprising movement control code that controls the first mobile object, the information processing system comprising:
   at least one first memory configured to store first program code; and
   at least one first processor configured to operate as instructed by the first program code, the first program code including:
   movement control code configured to cause at least one of the at least one first processor to:
   determine, on the basis of a predicted position of the flying object, a movement position for the first mobile object to acquire environmental information thereat, and
   execute movement control to move the first mobile object to the determined movement position;
   acquisition code configured to cause at least one of the at least one first processor to acquire environmental information relating to an ambient environment of the first mobile object at the determined movement position to which the first mobile object has moved, responsive to being positioned at the determined movement position and to a change in the ambient environment of the first mobile object at the determined movement position; and
   transmission control code configured to cause at least one of the at least one first processor to execute control of transmitting the environmental information or processed information of the environmental information to the control device or the flying object,
   wherein the predicted position is determined using information relating to at least one of a movement route of the flying object, a current position of the first mobile object, a posture of the flying object, or a movement speed of the flying object,
   wherein the storage stores formation information for positioning the first mobile object within at least a constant range relative to the flying object and the movement control code is further configured to cause at least one of the at least one first processor to access the storage, wherein the movement control code is further configured to cause at least one of the at least one first processor to execute the movement control to move the first mobile object using the formation information so as to acquire the environmental information within the constant range including at least a windward side or a leeward side of the flying object, wherein the control device includes at least one second memory configured to store second program code; and at least one second processor configured to operate as instructed by the second program code, the second program code including: movement route determination code configured to cause the at least one second processor to determine a safer movement route for the flying object according to threshold value set for elements of the environmental information, wherein the safer movement route is before a destination of the flying object, wherein the at least one second processor of the control device comprises a first CPU using at least a first communication unit, and the second program code includes communication code configured to cause the at least one second processor to: i) communicate with a fourth CPU of the flying object via the first communication unit and via the network, and ii) communicate with a second CPU of the at least one first processor via the first communication unit and via the network, wherein the control terminal comprises the second CPU and a second communication unit, and the movement control code is further configured to communicate with a third CPU of the first mobile object via the second communication unit and via the network, wherein the network is the Internet, wherein the movement control code is further configured to cause at least one of the at least one first processor to instruct the first mobile object using a first movement instruction to fly to a first altitude above the flying object before a take off of the flying object to sense a first wind speed and provide first environmental information to assist in the take off of the flying object, and wherein the information processing system is configured to cause the flying object to land at a scheduled landing point avoiding a collision with the ground based on the movement control code instructing the first mobile object using a second movement control instruction to assist a landing of the flying object to sense second wind speed and provide second environmental information.

2. The information processing system according to claim 1,
wherein the second program code includes flying code configured to cause the at least one second processor to execute flight control of the flying object on the basis of the environmental information or the processed information.

3. The information processing system according to claim 1,
wherein the movement position is a position spaced apart from a taking-off or the scheduled landing point of the flying object by a first distance in a horizontal direction, and by a second distance in a vertical direction,
wherein the movement control code is further configured to cause at least one of the at least one first processor to execute the movement control to move the first mobile object to a first position and to move a second mobile object a second position which are different in the second distance in the vertical direction, wherein a plurality of mobile objects comprises the first mobile object and the second mobile object,
the acquisition code is further configured to cause at least one of the at least one first processor to acquire the first environmental information relating to an environment at the first position, and the second environmental information relating to an environment at the second position, and
the transmission control code is further configured to cause at least one of the at least one first processor to execute control of transmitting the first environmental information and the second environmental information or processed information of the first environmental information and processed information of the second environmental information to the control device or the flying object.

4. The information processing system according to claim 1,
wherein the movement control code is further configured to execute the movement control to move the first mobile object such that a position of the first mobile object relative to a current position of the flying object is set to be constant.

5. The information processing system according to claim 1,
wherein the first mobile object is capable of moving as a movement group in combination with one or more other mobile objects of a plurality of mobile objects, wherein the plurality of mobile objects comprises the first mobile object, and
the movement position of each mobile object included in the movement group is determined on the basis of the environmental information relating to an ambient environment of at least one other mobile object included in the movement group.

6. The information processing system according to claim 5,
wherein the movement position of each mobile object included in the movement group is determined in consideration of a distribution in a horizontal direction and a distribution in a vertical direction.

7. The information processing system according to claim 5,
wherein, on the basis of the environmental information relating to the ambient environment of at least one mobile object included in the movement group, a total number of mobile objects included in the movement group is increased in correspondence to an increased level of influence of the ambient environment.

8. The information processing system according to claim 5,
wherein the movement position of at least one mobile object included in the movement group is determined with respect to a route section for which safety is not confirmed among a plurality of route sections in which the flying object is capable of flying, and
safety or non-safety is confirmed on the basis of the environmental information relating to an ambient environment of at least one mobile object included in the movement group.

9. The information processing system according to claim 8,
wherein a section for which safety is confirmed includes a route section to which another flying object or another mobile object flies or moves within a predetermined period.

10. An information processing method that is executed by an information processing system including a flying object, a control device that executes flight control of the flying object, a mobile object that supports flight of the flying object, a network, and a control terminal for mobile objects comprising a movement control code that controls the mobile object, comprising:
- determining, on the basis of a predicted position of the flying object, a movement position for the mobile object to acquire environmental information thereat;
- executing movement control to move the mobile object to the determined movement position;
- acquiring environmental information relating to an ambient environment of the mobile object at the determined movement position to which the mobile object has moved, responsive to being positioned at the determined movement position and to a change in the ambient environment of the mobile object at the determined movement position; and
- transmitting the environmental information or processed information of the environmental information to the control device or the flying object,
- wherein the predicted position is determined using information relating to at least one of a movement route of the flying object, a current position of the mobile object, a posture of the flying object, or a movement speed of the flying object the information processing method further comprising:
    - storing formation information for positioning the mobile object within at least a constant range relative to the flying object,
    - executing the movement control to move the mobile object using the formation information so as to acquire the environmental information within the constant range including at least a windward side or a leeward side of the flying object, and
    - determining, in the control device, a safe movement route for the flying object according to threshold value set for elements of the environmental information, wherein a safer movement route is before a destination of the flying object,
- wherein the control device comprises a first CPU using at least a first communication unit, and is further configured to: i) communicate with a fourth CPU of the flying object via the first communication unit and via the network, and ii) communicate with a second CPU of the control terminal via the first communication unit and via the network, wherein the control terminal comprises the second CPU and a second communication unit, and the control terminal is further configured to communicate with a third CPU of the mobile object via the second communication unit and via the network,
- wherein the network is the Internet,
- wherein the information processing method causes the mobile object using a first movement instruction to fly to a first altitude above the flying object before a take off of the flying object to sense a first wind speed and provide first environmental information to assist in the take off of the flying object, and
- wherein the information processing method causes the flying object to land at a scheduled landing point avoiding a collision with the ground based on the movement control code instructing the mobile object using a second movement control instruction to assist a landing of the flying object to sense second wind speed and provide second environmental information.

11. The information processing system according to claim 1,
wherein determining the movement position comprises determining a destination at which the flying object will exist after a predetermined time.

12. The information processing system according to claim 1,
wherein the information processing system further comprises a plurality of mobile objects, and the plurality of mobile objects comprises the first mobile object and a second mobile object,
the movement control code is further configured to cause at least one of the at least one first processor to move the first mobile object to a first position spaced apart by a first horizontal distance in a horizontal direction and a first vertical distance in a vertical direction with respect to the scheduled landing point of the flying object,
the movement control code is further configured to cause at least one of the at least one first processor to move the second mobile object to a second position with respect to the scheduled landing point of the flying object,
the acquisition code is further configured to cause at least one of the at least one first processor to acquire first measurement information relating to an environment at the first position and second measurement information relating to an environment at the second position, and
the transmission control code is further configured to cause at least one of the at least one first processor to execute control of transmitting the first measurement information and the second measurement information or processed information of the first measurement information and processed information of the second measurement information to the control device or the flying object.

13. The information processing system according to claim 1,
wherein the predicted position is determined using information relating to an inclination of the flying object.

14. The information processing system according to claim 1, wherein the movement control code is further configured to cause at least one of the at least one first processor to determine a different movement position for each mobile object of a plurality of mobile objects, each mobile object of the plurality of mobile objects selected to correspond to a different predicted position of a plurality of predicted positions of the flying object, the movement position of each mobile object determined on the basis of the predicted position corresponding to the mobile object, each predicted position of the plurality of predicted positions being a position located on a candidate movement route of a plurality of candidate movement routes for the flying object.

15. The information processing system according to claim 14,
wherein the movement route determination code is further configured to cause at least one of the at least one second processor to:
determine a degree of safety of each candidate movement route of the plurality of candidate movement routes on the basis of the environmental information relating to the ambient environment acquired by the first mobile object, wherein the first mobile object has moved to a movement position located on a respective candidate route, and
select a subsequent movement route of the flying object from the plurality of candidate movement routes on the basis of respective degrees of safety of the plurality of candidate movement routes, and the control device executes flight control of the flying object to move according to a movement instruction generated on the basis of the subsequent movement route.

16. The information processing system according to claim 1, wherein the movement route determination code is further configured to cause at least one of the at least one second processor to determine a position on a predicted route of the flying object as the determined movement position.

17. The information processing system according to claim 5, wherein the plurality of mobile objects set a combination based on the environmental information acquired and the formation information acquired.

18. The information processing system according to claim 1, wherein a plurality of mobile objects obtain environmental information of possible candidate routes by moving through the candidate routes, and the flying object, based on the obtained environmental information, is instructed to follow a candidate route of the possible candidate routes deemed to be the most safe, and the flying object subsequently follows the candidate route deemed to be the most safe.

19. The information processing system of claim 1, wherein the communication code of the control device during the landing, is further configured to cause at least one of the at least one first processor to receive via the network a first position of the flying object from the flying object and communicate the first position to the movement control code via the network, the movement control code during the landing, based on the first position, is further configured to cause at least one of the at least one first processor to transmit via the network the first movement instruction or the second movement control instruction to the mobile object and the mobile object moves in response to the first movement instruction, the mobile object during the landing transmits via the network third environmental information to the second CPU and the second CPU transmits via the network the third environmental information to the control device, the communication code of the control device during the landing is further configured to cause at least one of the at least one first processor to transmit via the network a third movement instruction to the flying object, wherein the third movement instruction is based on the third environmental information, and the flying object during the landing moves based on the third movement instruction.

20. The information processing system of claim 1, wherein the communication code of the control device, as a portion of a flow of flight support processing, is further configured to cause at least one of the at least one first processor to receive via the network a first position of the flying object from the flying object and communicate the first position to the movement control code via the network, the movement control code, in the flow of flight support processing, based on the first position, is further configured to cause at least one of the at least one first processor to transmit via the network the first movement instruction or the second movement control instruction to the mobile object and the mobile object moves in response to the first movement instruction, the mobile object, in the flow of flight support processing, transmits via the network third environmental information to the second CPU and the second CPU transmits via the network the third environmental information to the control device, the communication code of the control device, in the flow of flight support processing, is further configured to cause at least one of the at least one first processor to transmit via the network a third movement instruction to the flying object, wherein the third movement instruction is based on the third environmental information, and the flying object, in the flow of flight support processing, moves based on the third movement instruction.

* * * * *